US012495387B2

(12) United States Patent
Anandhanarayanan et al.

(10) Patent No.: US 12,495,387 B2
(45) Date of Patent: Dec. 9, 2025

(54) RELATIVE POSITION OF A WIRELESS DEVICE USING COMPRESSED BEAMFORMING REPORTS

(71) Applicant: QUALCOMM Incorporated, San Diego, CA (US)

(72) Inventors: Sivakumar Anandhanarayanan, Cuddalore (IN); Sumit Baheti, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 603 days.

(21) Appl. No.: 17/934,554

(22) Filed: Sep. 22, 2022

(65) Prior Publication Data

US 2024/0107494 A1    Mar. 28, 2024

(51) Int. Cl.
*H04W 64/00* (2009.01)
*G01S 5/02* (2010.01)

(52) U.S. Cl.
CPC ......... *H04W 64/003* (2013.01); *G01S 5/0284* (2013.01)

(58) Field of Classification Search
CPC ......... H04W 24/02; H04W 4/02; H04W 4/40; H04W 64/003; H04W 84/06
USPC .... 455/456, 534, 419, 436, 446, 456.1, 522, 455/67.11, 509, 434, 13.4
See application file for complete search history.

(56) References Cited

U.S. PATENT DOCUMENTS

| | | | | |
|---|---|---|---|---|
| 11,616,616 | B2* | 3/2023 | Werner | H04B 7/0894 370/329 |
| 11,617,144 | B2* | 3/2023 | Baldemair | H04J 11/0056 370/336 |
| 12,155,601 | B2* | 11/2024 | Baldemair | H04L 5/0073 |
| 2011/0039517 | A1 | 2/2011 | Wigren et al. | |
| 2015/0133173 | A1* | 5/2015 | Edge | G01S 5/08 455/456.6 |
| 2017/0108575 | A1 | 4/2017 | Yang et al. | |
| 2020/0053740 | A1 | 2/2020 | Wigren et al. | |
| 2020/0083938 | A1* | 3/2020 | Park | H04B 7/0456 |
| 2021/0329416 | A1 | 10/2021 | Li et al. | |
| 2022/0022071 | A1* | 1/2022 | Leather | H04B 7/0452 |

(Continued)

OTHER PUBLICATIONS

Partial International Search Report—PCT/US2023/032353—ISA/EPO—Dec. 22, 2023.

(Continued)

*Primary Examiner* — Joseph Arevalo
(74) *Attorney, Agent, or Firm* — QUALCOMM Incorporated

(57) ABSTRACT

A first wireless device may obtain a configuration of a three-dimensional (3D) space. The 3D space may include a set of discrete points. The configuration may include a set of established compressed beamforming (CBF) reports. Each of the set of established CBF reports may be associated with at least one discrete point of the set of discrete points. The first wireless device may receive an updated CBF report from a second wireless device. The first wireless device may calculate a location of the second wireless device based on the updated CBF report and the set of established CBF reports. The first wireless device may be an access point (AP), a base station, a network node, a network entity, or a transmission reception point (TRP). The second wireless device may be a station (STA) or a UE.

29 Claims, 14 Drawing Sheets

(56) References Cited

U.S. PATENT DOCUMENTS

| | | | |
|---|---|---|---|
| 2023/0179388 A1* | 6/2023 | Baldemair | H04L 5/0044 |
| | | | 370/329 |
| 2023/0208502 A1* | 6/2023 | Tidestav | H04B 7/088 |
| | | | 375/346 |
| 2024/0022927 A1* | 1/2024 | Tong | H04W 4/40 |
| 2024/0171315 A1* | 5/2024 | Eriksson | H04L 1/1861 |
| 2024/0422717 A1* | 12/2024 | Shimoda | G01S 5/14 |

OTHER PUBLICATIONS

International Search Report and Written Opinion—PCT/US2023/032353—ISA/EPO—Apr. 2, 2024.

* cited by examiner

RELATIVE POSITION OF A WIRELESS DEVICE USING COMPRESSED BEAMFORMING REPORTS

TECHNICAL FIELD

The present disclosure relates generally to communication systems, and more particularly, to a wireless device positioning system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first wireless device are provided. The apparatus may obtain a configuration of a three-dimensional (3D) space. The 3D space may have a set of discrete points. The configuration may include a set of established compressed beamforming (CBF) reports. Each of the set of established CBF reports may be associated with at least one discrete point of the set of discrete points. The first wireless device may receive an updated CBF report from a second wireless device. The first wireless device may calculate a location of the second wireless device based on the updated CBF report and the set of established CBF reports.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
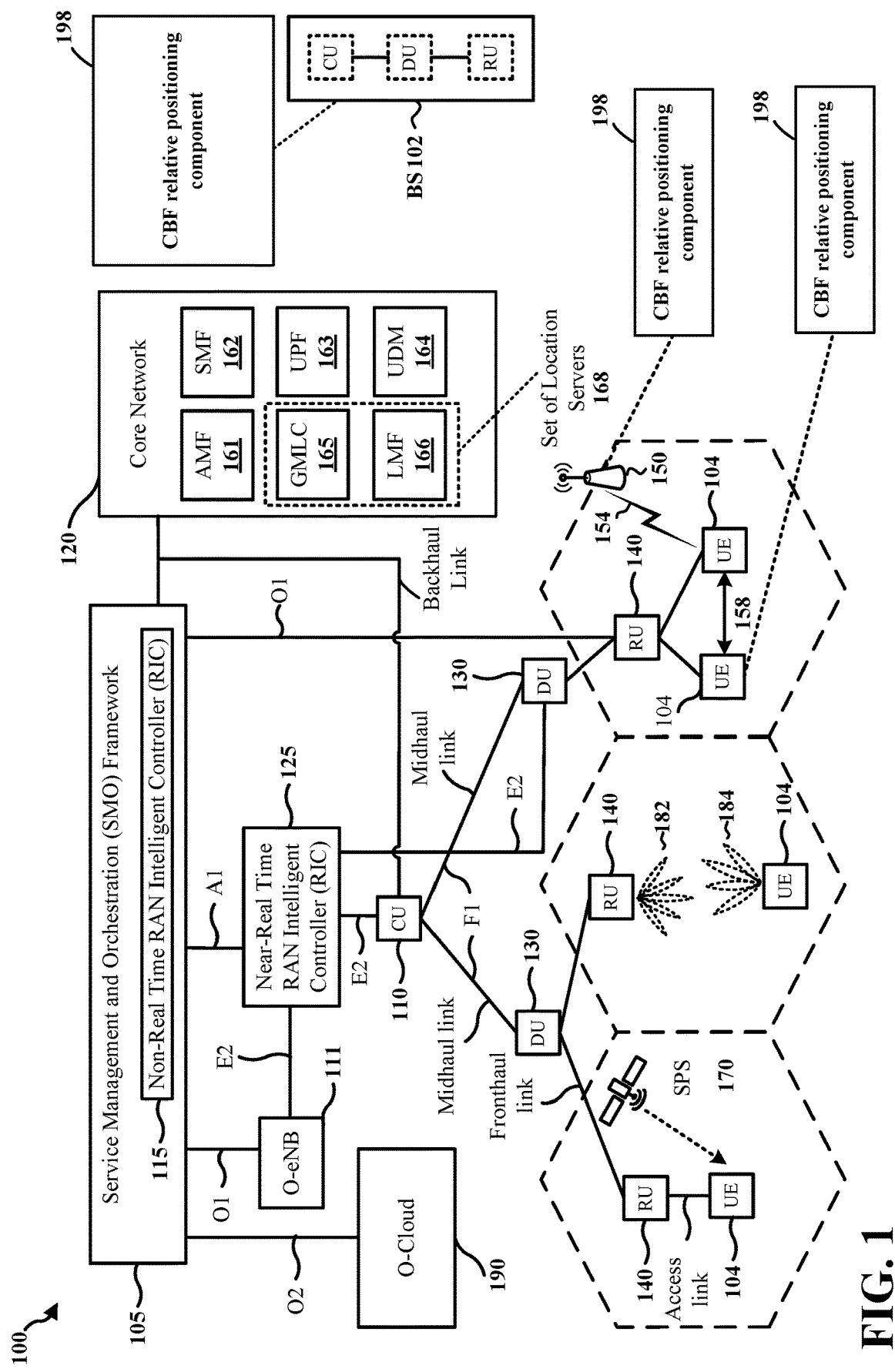
FIG. 1 is a diagram illustrating an example of a wireless communications system and an access network.

Positioning methods may be used to calculate a location of a non-fixed wireless device, such as a user equipment (UE) or a station (STA). However, such methods may depend upon remote global positioning satellites (GPS) which don't have a fine resolution (accuracy of a few meters or even a few miles). More accurate positioning methods may be used by calculating the round trip time (RTT) for positioning signals between a non-fixed wireless device and a plurality of fixed wireless devices whose locations are known (e.g., multiple transmission reception points (TRPs) or multiple access points (APs)). However not all wireless devices are connected to a plurality of fixed wireless devices with known locations to utilize such positioning methods. An accurate way to determine a location of a UE or a STA using a single fixed wireless device, such as an AP, a base station, a network node, a network entity, or a TRP, may be realized using a pre-calibrated configuration of a three-dimensional (3D) space about the single fixed wireless device.

In one aspect, a first wireless device may obtain a configuration of a 3D space. The 3D space may have a set of discrete points. The configuration may include a set of established compressed beamforming (CBF) reports. Each of the set of established CBF reports may be associated with at least one discrete point of the set of discrete points. The first wireless device may receive an updated CBF report from a second wireless device. The first wireless device may calculate a location of the second wireless device based on the updated CBF report and the set of established CBF reports. The first wireless device may also be referred to as a fixed wireless device, and the second wireless device may also be referred to as a non-fixed wireless device.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include an AP 150 in communication with UEs 104 via communication link 154. For example, the AP 150 may be a Wi-Fi station that communicates with a UE 104 in a 5 GHz unlicensed frequency spectrum or the like. A UE 104 that connects with an AP 150 may also be referred to as a station (STA). In some aspects, the AP 150 may be a UE configured to communicate with a STA via a tethered or shared communication link, such as a Wi-Fi link, a Bluetooth link, or a sidelink communication link. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmission reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to have a CBF relative positioning component 198. In certain aspects, the base station 102 may be configured to have a CBF relative positioning component 198. In certain aspects, the AP 150 may be configured to have a CBF relative positioning component 198. The CBF relative positioning component 198 may obtain a configuration of a 3D space. The 3D space may include a set of discrete points. The configuration may include a set of established CBF reports. Each of the set of established CBF reports may be associated with at least one discrete point of the set of discrete points. The CBF relative positioning component 198 may receive an updated CBF report from a wireless device. The CBF relative positioning component 198 may calculate a location of the wireless device based on the updated CBF report and the set of established CBF reports. The UE 104 may operate as an AP for another UE. For example, a mobile phone UE may tether a laptop UE to the Internet via a Wi-Fi connection shared by the mobile phone UE. Although the following description may be focused on devices connected via Wi-Fi, the concepts described herein may be applicable to other similar areas, such as 5G NR, LTE, LTE-A, CDMA, GSM, and other wireless technologies.

Figure 2:
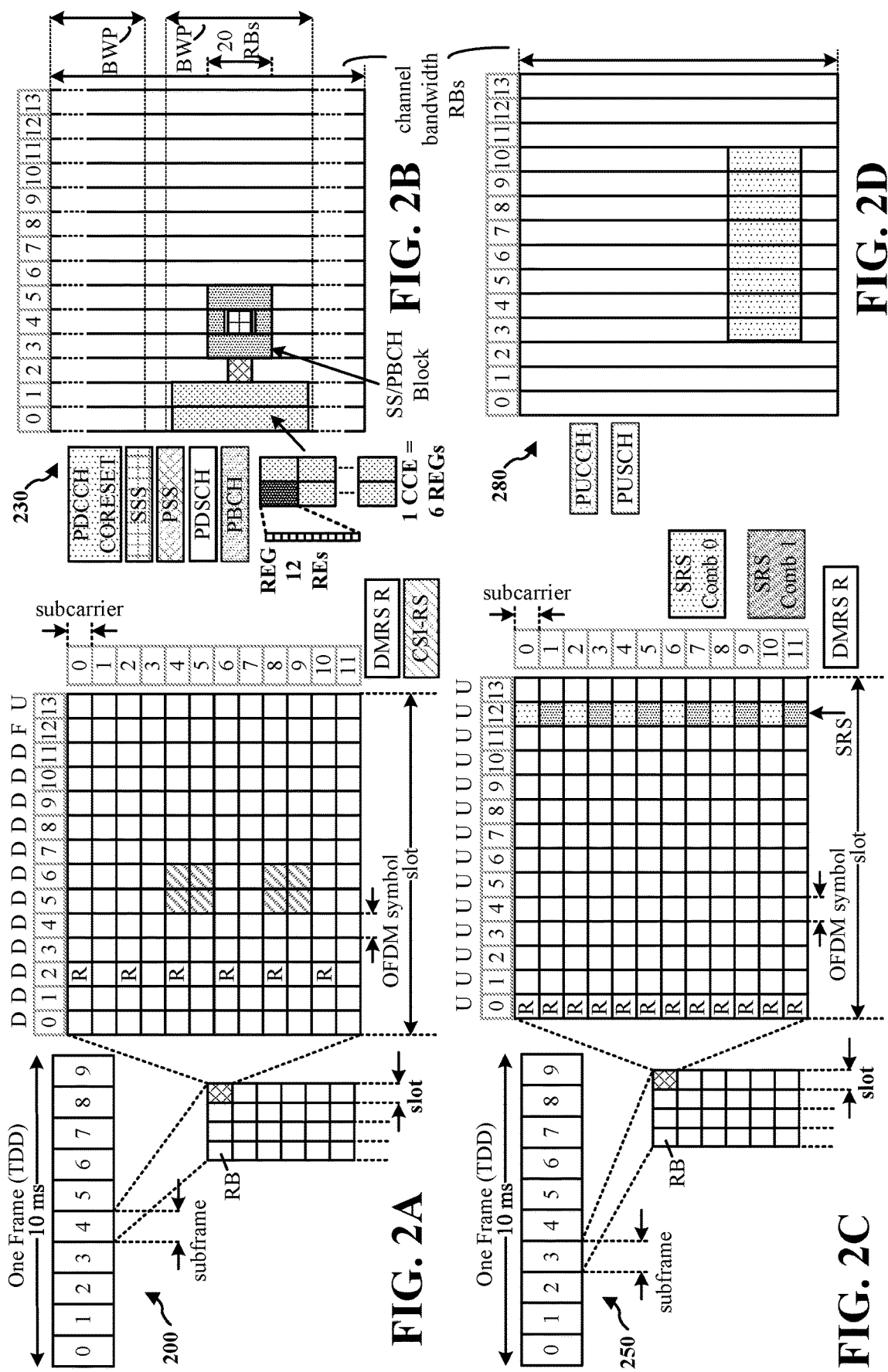
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
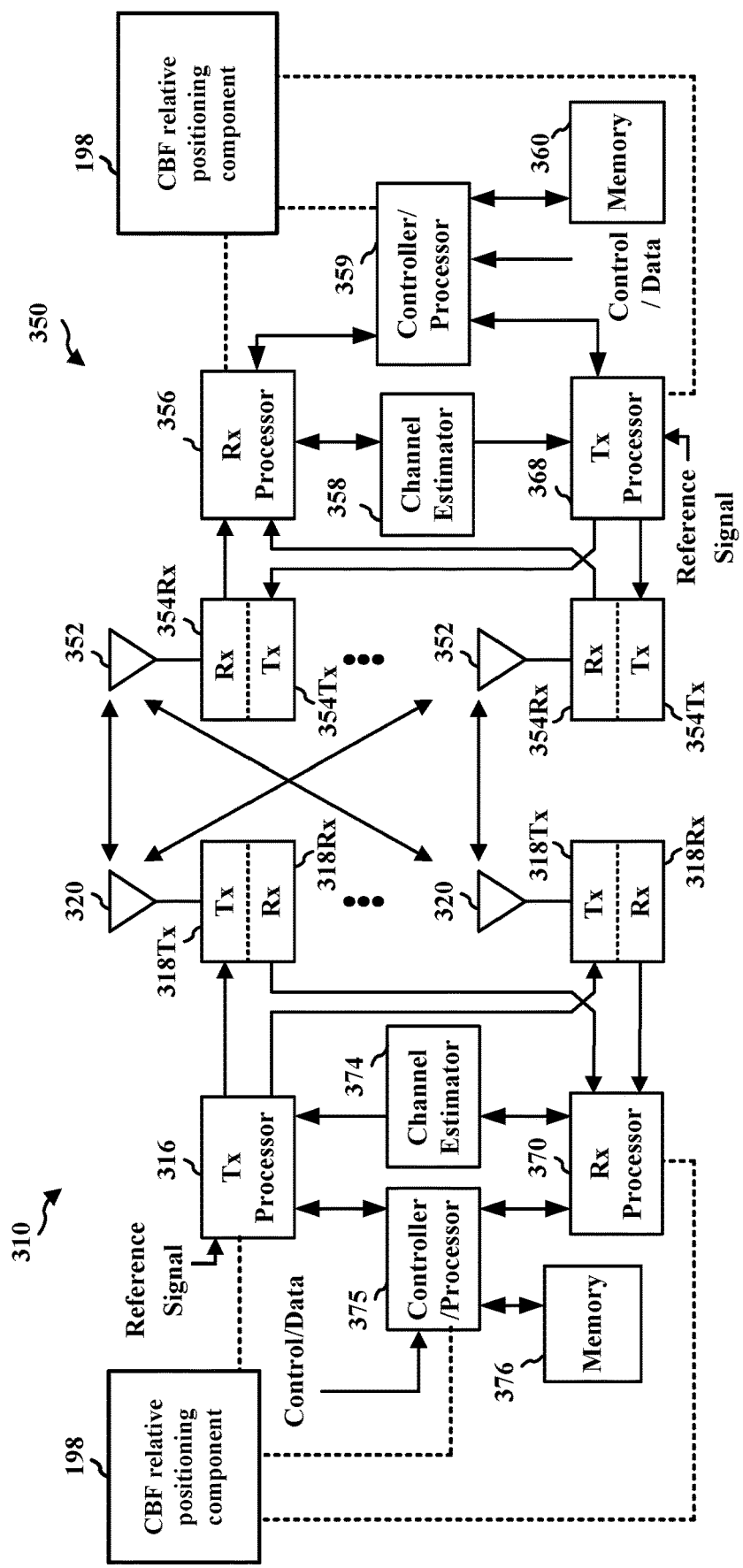
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal may include a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the CBF relative positioning component 198 of FIG. 1.

At least one of the Tx processor 316, the Rx processor 370, and the controller/processor 375 may be configured to perform aspects in connection with the CBF relative positioning component 198 of FIG. 1.

Figure 4:
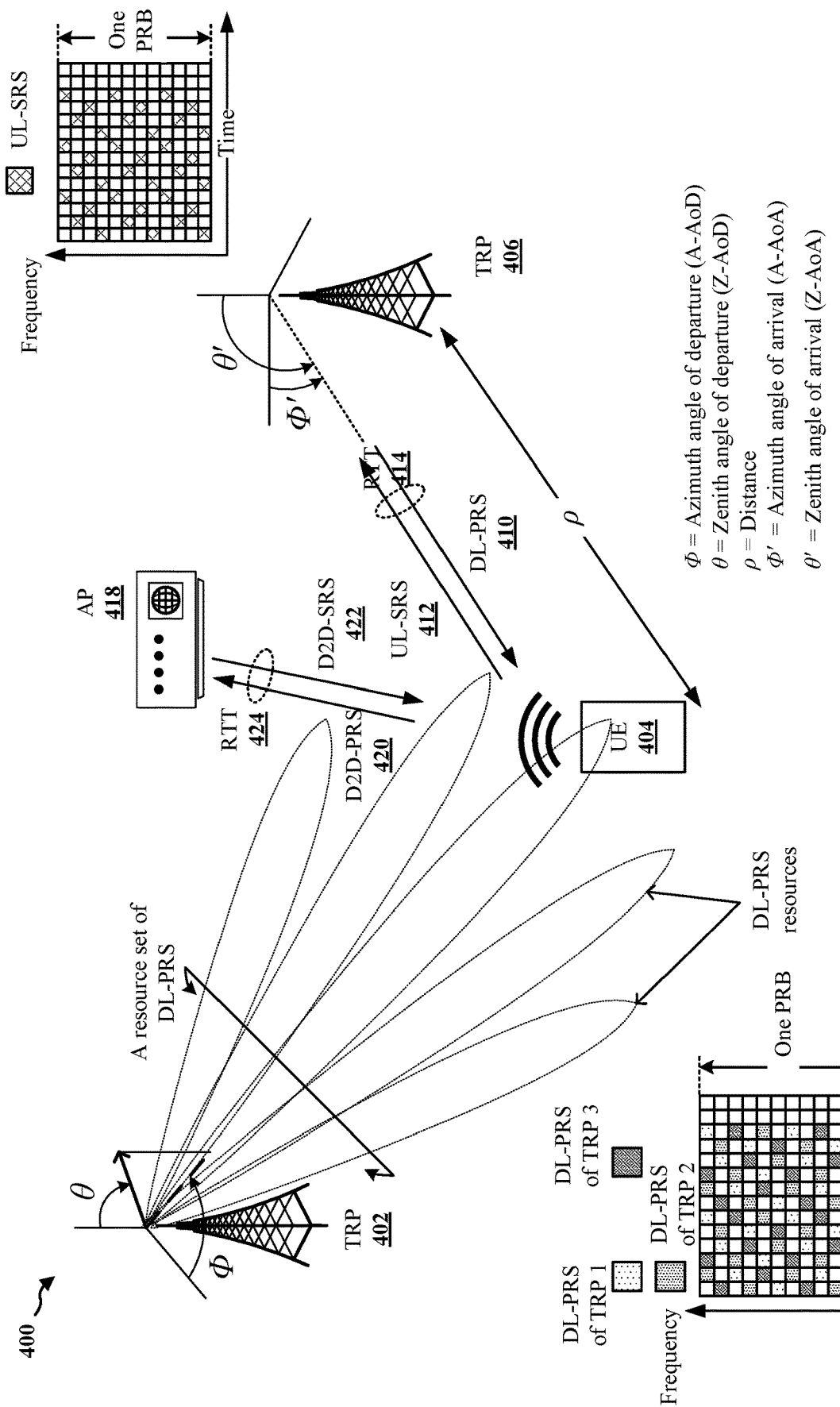
FIG. 4 is a diagram illustrating an example of a UE positioning based on reference signal measurements.

FIG. 4 is a diagram 400 illustrating an example of a UE positioning based on reference signal measurements. The UE 404 may transmit an uplink SRS (UL-SRS) 412 at time $T_{SRS\_TX1}$ and receive DL positioning reference signals (PRS) (DL-PRS) 410 at time $T_{PRS\_RX1}$. The TRP 406 may receive the UL-SRS 412 at time $T_{SRS\_RX1}$ and transmit the DL-PRS 410 at time $T_{PRS\_TX1}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $||T_{SRS\_RX1} - T_{PRS\_Tx1}| - |T_{SRS\_TX1} - T_{PRS\_RX1}||$. The positioning server may calculate a distance between the TRP 406 and the UE 404 based on the RTT 414. Moreover, multi-RTT positioning may make use of the UE Rx-Tx time difference measurements (i.e., $|T_{SRS\_TX1} - T_{PRS\_RX1}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX1} - T_{PRS\_TX1}|$) and UL-SRS-RSRP at multiple TRPs 402, 406 of uplink signals transmitted from UE 404. The UE 404 measures the UE Rx-Tx time difference measurements (and DL-PRS-RSRP of the received signals) using assistance data received from the positioning server, and the TRPs 402, 406 measure the gNB Rx-Tx time difference measurements (and UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and DL-PRS-RSRP) of downlink signals received from multiple TRPs 402, 406 at the UE 404. The UE 404 measures the DL RSTD (and DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and UL-SRS-RSRP) at multiple TRPs 402, 406 of uplink signals transmitted from UE 404. The TRPs 402, 406 measure the UL-RTOA (and UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Similarly, the AP 418 may transmit a device-to-device SRS (D2D-SRS) 422 at a time $T_{SRS\_TX2}$ and may receive a device-to-device PRS (D2D-PRS) 420 at time $T_{PRS\_RX2}$. The UE 404 may receive the D2D-SRS 422 at time $T_{SRS\_RX2}$ and may transmit the D2D-PRS 420 at time $T_{PRS\_TX2}$. The AP 418 may receive the D2D-PRS 420 before transmitting the D2D-SRS 422, or may transmit the D2D-SRS 422 before receiving the D2D-PRS 420. The AP 418 may determine the RTT 424 based on $||T_{SRS\_RX2} - T_{PRS\_TX2}| - |T_{SRS\_TX2} - T_{PRS\_RX2}||$. The AP 418 may calculate a distance between the AP 418 and the UE 404 based on the RTT 424.

While the positioning methods above may be used to calculate a distance between the TRP 406 and the UE 404, a distance between the TRP 402 and the UE 404, and a distance between the AP 418 and the UE 404, such positioning methods may not be used to determine a location of the UE 404 without measurements with a plurality of wireless devices. For example, the positioning methods may be used to determine a location of the UE 404 by measuring communications with multiple TRPs 402 and 406, but not from one TRP 406 without other TRPs. Similarly, positioning methods such as fine time measurement (FTM) RTT (FTM-RTT) or next generation positioning (NGP) may be used to determine a location of the UE 404 by measuring communications with multiple APS, but not from one AP 418. While the UE 404 may be able to use a GPS, an assisted GPS (A-GPS), or a GNSS system to determine a location of the UE, the relative location accuracy may vary from a few meters to a few miles. An accurate way to determine a location of a UE or a STA using a single wireless device, such as an AP, a base station, a network node, a network entity, or a TRP, may be realized using a pre-calibrated configuration of a 3D space about the single wireless device.

In one aspect, a first wireless device may obtain a configuration of a 3D space. The 3D space may have a set of discrete points. The configuration may include a set of established CBF reports. Each of the set of established CBF reports may be associated with at least one discrete point of the set of discrete points. The first wireless device may receive an updated CBF report from a second wireless device. The first wireless device may calculate a location of the second wireless device based on the updated CBF report and the set of established CBF reports. The first wireless device may also be referred to as a fixed wireless device, and the second wireless device may also be referred to as a non-fixed wireless device.

Figure 5:
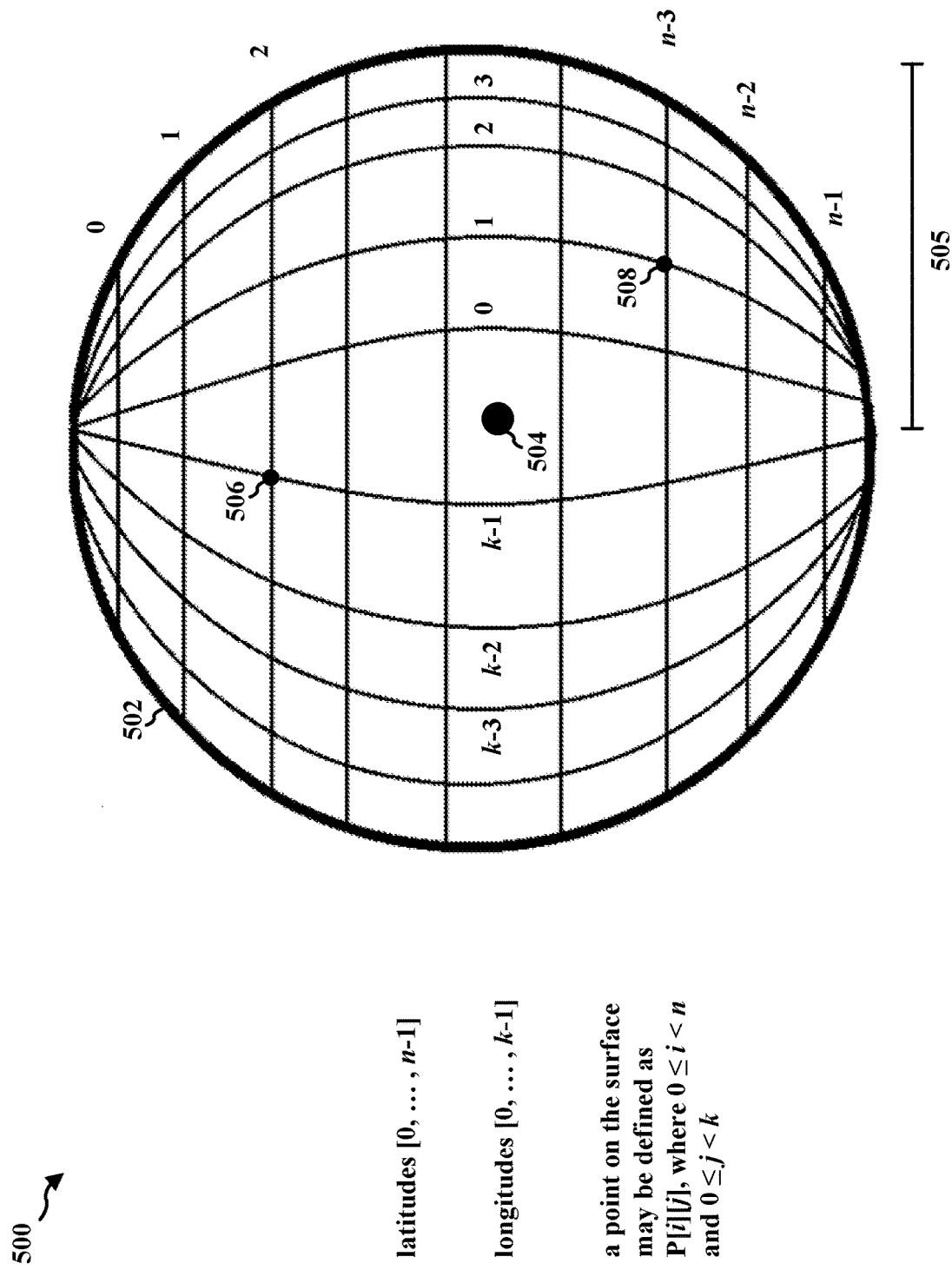
FIG. 5 is a diagram of a three-dimensional (3D) space around a wireless device, in accordance with various aspects of the present disclosure.

FIG. 5 is a diagram 500 illustrating a 3D space 502 having a center 504 and a radius 505. The 3D space 502 is shown as a sphere having latitudes numbering from 0 to n−1 and longitudes numbering from 0 to k−1. In other words, the 3D space 502 may define a spherical space about the center 504 with a radius 505, divided into n latitudes and k longitudes. A point on the surface of the 3D space 502 may be represented by a position P[i][j], where 0≤i<n and 0≤j<k. For example, the point 506 on the surface of the 3D space 502 may be represented by P[2][k−1], and the point 508 on the surface of the 3D space 502 may be represented by P[n−3][1]. The set of each of the positions P[i][j] from 0≤i<n and 0≤j<k may be referred to as a set of discrete points. Such a 3D space 502 may be used to determine a position of a second wireless device relative to a first wireless device.

In one aspect, the center 504 may represent a fixed wireless device, such as an AP, a base station, a network node, a network entity, or a TRP. The fixed wireless device may be fixed in place for a period of time. The radius 505 may represent a calculated distance that a non-fixed wireless device, such as a UE or a STA, is located from the fixed wireless device. The non-fixed wireless device may move from one location to another location from time to time, at least more often than the fixed wireless device may move from one location to another location. The location of the non-fixed wireless device relative to the fixed wireless device may be represented as a position P[i][j] on the surface of the 3D space 502, where i may indicate the latitude of the non-fixed wireless device varying from 0 to n−1 and j may indicate the longitude of the non-fixed wireless device varying from 0 to k−1.

A dictionary in terms of key-value pairs may be created to calibrate a fixed wireless device disposed at the center 504 of the 3D space 502. Such a dictionary may also be referred to as a configuration of the 3D space 502. The keys of the key-value pairs may be CBF reports collected through explicit sounding procedures. Any suitable sounding procedures may be used, such as the positioning methods disclosed with respect to FIG. 4, implicit sounding procedures defined in IEEE 802.11 a/n standards, or explicit sounding procedures defined by IEEE 802.11 n/ac/ax/be standards. The values of the key-value pairs may be the position of the non-fixed wireless device relative to the fixed wireless device in a virtual 3D space. With the fixed wireless device fixed at the center 504 of FIG. 5, the non-fixed wireless device may be placed at each of the positions P[i][j] from 0≤i<n and 0≤j<k, or each of the set of discrete points of the 3D space 502. At each of the positions P[i][j], the fixed wireless device may use a sounding procedure to collect a CBF report R[i][j] from the non-fixed wireless device. Each of the CBF reports R[i][j] may be stored on a memory of the fixed wireless device. The set of CBF reports R[i][j] may be used to calculate a location of a wireless device that later transmits a CBF report to the fixed wireless device.

The dictionary of the 3D space 502, or the configuration of the 3D space 502, may be performed once for the 3D space 502. The configuration of the 3D space 502 may include a set of discrete points (one for each position on the surface of the 3D space 502) and a set of established CBF reports associated with each of the set of discrete points. Once the configuration of the 3D space 502 is created, the fixed wireless device located at the center 504 may locate any non-fixed wireless device distanced from the fixed wireless device by the radius 505 by collecting a CBF report from the non-fixed wireless device. The fixed wireless device may correlate the received CBF report with the set of established CBF reports in the configuration of the 3D space 502. The established CBF report that is the most closely correlated with the received CBF report may be determined to be the closest point to the location of the wireless device that generated the received CBF report. The fixed wireless device may determine the direction of a non-fixed wireless device based on the maximally correlated, or non-orthogonal established CBF report with the CBF report received from the non-fixed wireless device.

Figure 6:
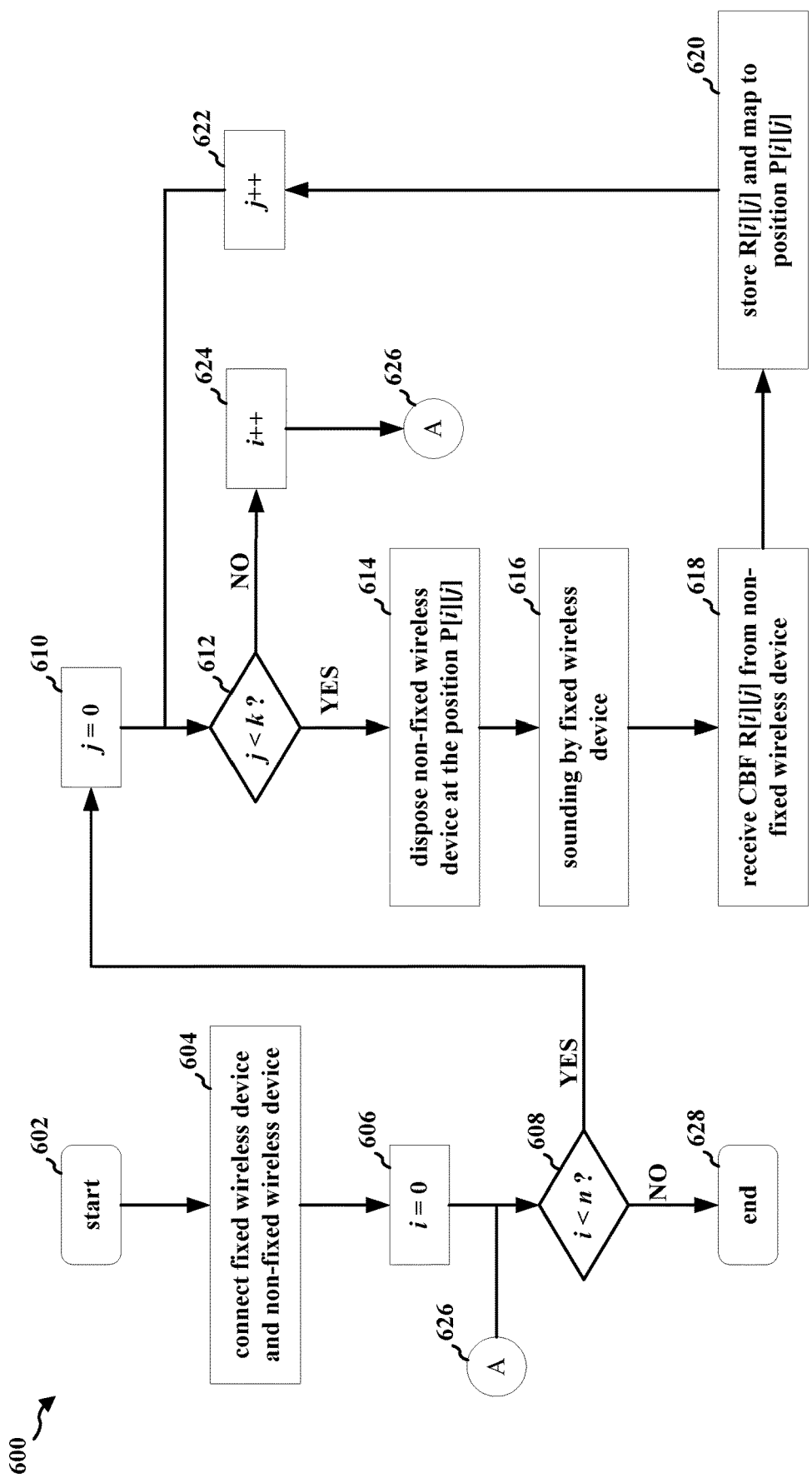
FIG. 6 is a flowchart of a method of creating a configuration of a 3D space having a set of discrete points

FIG. 6 is a flowchart 600 of a method of creating a configuration of a 3D space having a set of discrete points similar to the 3D space 502 in FIG. 5. At 602, the process may start by initializing a 3D space about the fixed wireless device, such as a sphere having a defined radius. The sphere may have a set of discrete points defined by positions P[i][j], where i may correspond with a latitude of the 3D space and j may correspond with a longitude of the 3D space. The latitude of the 3D space may span the integers from 0 to n, and the longitude of the 3D space may span the integers from 0 to k.

At 604, the fixed wireless device and the non-fixed wireless device may be connected to one another, for example via a Wi-Fi connection, a Bluetooth connection, a sidelink connection, or an access link with a base station, network node, network entity, or a TRP. The connection may be configured to allow the fixed wireless device to transmit a sounding signal to the non-fixed wireless device, and for the non-fixed wireless device to transmit a CBF report to the fixed wireless device based on the sounding signal.

At 606, the value of i may be initialized to zero. At 608, the value of i may be compared to the value of n. If i is less than n, the method may proceed to 610. At 610, the value of j may be initialized to zero. At 612, the value of j may be compared to the value of k. If j is less than k, the method may proceed to 614.

At 614, the non-fixed wireless device may be disposed at the position P[i][j]. For example, immediately after initialization, the non-fixed wireless device may be disposed at the position P[0][0]. At 616, the fixed wireless device may trigger a sounding to the non-fixed wireless device, for example by transmitting the D2D-SRS 422 in FIG. 4 or by transmitting a physical layer (PHY) protocol data unit (PPDU). The fixed wireless device may be an access point or a router. The non-fixed wireless device may be a STA, such as a laptop, a mobile phone, or a UE. The non-fixed wireless device may receive the sounding PPDU/D2D-SRS and may generate the CBF report. The fixed wireless device may request the non-fixed wireless device to transmit the CBF report to the fixed wireless device. At 618, the fixed wireless device may receive a CBF report from the non-fixed wireless device located at the position P[i][j]. The CBF report may be for one or more spatial streams. The CBF report at position P[i][j] may be referred to as R[i][j]. At 620, the value of R[i][j] may be stored and mapped to the position P[i][j]. For example, if the non-fixed wireless device is disposed at the position P[0][0], the value of R[0][0] (the CBF report received from the non-fixed wireless device located at position P[0][0]) may be stored and mapped to the position P[0][0]. This may be stored, for example, on a memory of the fixed wireless device, or a database accessible to the fixed wireless device (e.g., a NAS device or a cloud-based database).

At 622, the value of j may be incremented by one, and the method may proceed to 612, where the value of j may be compared to the value of k. If j is less than k, the method may proceed to 614, 616, 618, and 620 again to record a second CBF report, for example R[0][1]. At 622, the value of j may be incremented by one again.

At some point, at 612, the value of j may not be less than k, for example if j has been incremented to equal k. The method may proceed to 624. At 624, the value of i may be incremented by one. The method may proceed to 626, and then to 608. At 608 the value of i may be compared to the value of n. If i is less than n, the method may proceed to 610. At 610, the value of j may again be initialized to zero. At 612, the value of j may be compared to the value of k. If j is less than k, the method may proceed to 614, 616, 618, and 620 again to record yet another CBF report, for example R[1][0]. At 622, the value of j may be incremented and the method may proceed to 612 to collect another series of CBF reports.

At some point, at 608, the value of i may not be less than n, for example if i has been incremented to equal n. The method may proceed to 628, at which point the method has ended, as the CBF reports at each of the positions has been collected and stored. At this point, the configuration of the 3D space has been generated, and may be used by the fixed wireless device to calculate a location of any non-fixed wireless device at that radius based on a received CBF report.

In some aspects, the configuration of the 3D space may be saved to a remote database, such as a NAS or a cloud-based database, accessible to the fixed wireless device, in addition to a local memory of the fixed wireless device. By saving the configuration of the 3D space to a remote database, other fixed wireless devices may be able to use the configuration of the 3D space. The configuration of the 3D space may be mapped to a location or environmental condition of the fixed wireless device, so that any other fixed wireless device of the same type disposed in that location or environmental condition may use the same configuration of the 3D space. In one aspect, the fixed wireless device may be a first AP that is replaced by a second AP of the same type, and the second AP may then obtain a copy of the configuration of the 3D space (e.g., by accessing a common database, or by copying the configuration from the first AP to the second AP) to locate wireless devices that connect to the second AP without having to recreate the configuration. In another aspect, the fixed wireless device may be a first AP that is located in a room of a building, and second AP of the same type may be placed in a similar room of a similar building (the rooms and building share a same set of attributes). The second AP may then obtain a copy of the configuration of the 3D space to locate non-fixed wireless devices that connect to the second AP without having to recreate the configuration. In another aspect, the fixed wireless device may associate a first configuration of a 3D space with a first fixed location, and may associate a second configuration of a 3D space with a second fixed location. When the fixed wireless device is moved to the first fixed location, the fixed wireless device may use the first configuration of the 3D space, and when the fixed wireless device is moved to the second fixed location, the fixed wireless device may use the second configuration of the 3D space.

A configuration of a spherical 3D space, such as the spherical 3D space 502 in FIG. 5, may be associated with one radius. However, a non-fixed wireless device whose position is not known may not always be located the same distance from the fixed wireless device having the configuration of the 3D space. A plurality of dictionaries, or configurations of 3D spaces, may be generated for a fixed wireless device for a plurality of radii. For example, a first dictionary may be created for a first virtual spherical 3D space about a fixed wireless device having a first radius, and a second dictionary may be created for a second virtual spherical 3D space about the fixed wireless device having a second radius. A set of dictionaries for a fixed wireless device may be created for a confined or closed space (e.g., a room or a building) by collecting a plurality of CBF reports in various locations about the confined or closed space.

Figure 7:
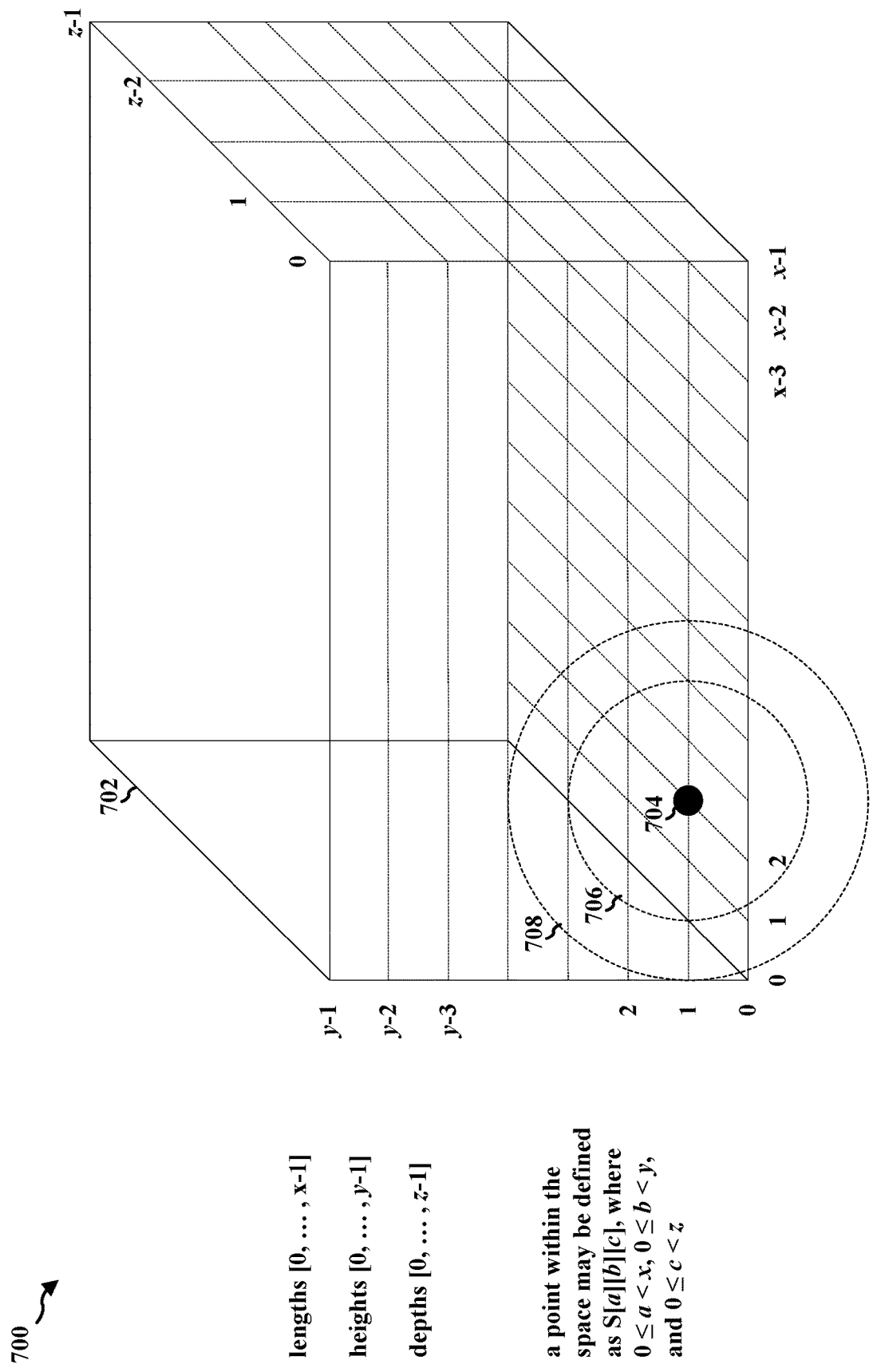
FIG. 7 is a diagram of a prism-shaped space having a wireless device with a plurality of virtual 3D spaces defined about the wireless device, in accordance with various aspects of the present disclosure.

FIG. 7 is a diagram 700 illustrating a space 702 having lengths numbering from 0 to x−1, heights numbering from 0 to y−1, and depths numbering from 0 to z−1. In other words, the space 702 may define a prism-shaped space from the vertex S[0][0][0] to the vertex S[x−1][y−1][z−1], divided into x lengths, y heights, and z depths. A fixed wireless device may be located at the point 704, located at S[2][0][1] of the space 702. A non-fixed wireless device used to generate CBF reports for a plurality of configurations of a spherical 3D space may move anywhere about the space 702. A first 3D space 706 having a first radius may be defined about the point 704 and a second 3D space 708 having a second radius may be defined about the point 704. The fixed wireless device may calculate a distance from the non-fixed wireless device using an RTT, for example by using the positioning methods described with respect to FIG. 4. As the fixed wireless device collects CBF reports from the non-fixed wireless device, the fixed wireless device may associate each CBF report with a point on a corresponding 3D space based on the calculated distance between the fixed wireless device and the non-fixed wireless device. The calculated distance may be associated with a radius, which corresponds to a 3D space having that radius. In this manner, the fixed wireless device located at the point 704 may generate a plurality of configurations for 3D spaces having a set of CBF reports, where each configuration may be associated with a radius (i.e., distance between the fixed wireless device and the wireless device transmitting the CBF report).

In some aspects, the non-fixed wireless device may be moved to every discrete position for each 3D space of every radius, for example the 3D space 706 and the 3D space 708. The non-fixed wireless device may be moved under the floor of the space 702 or behind a wall of the space 702. In other aspects, the non-fixed wireless device may be moved to discrete positions within the space 702 and not to positions outside the space 702 during calibration, so each 3D space may not define a plurality of positions on a surface of a full sphere about the point 704, but may define a plurality of positions on a surface of a partial sphere about the point 704 that is located within the space 702. As a result, a user initializing the plurality of configurations of 3D spaces does not move behind a wall, under a floor, or above a ceiling in order to fully initialize the plurality of configurations for the fixed wireless device.

Figure 8:
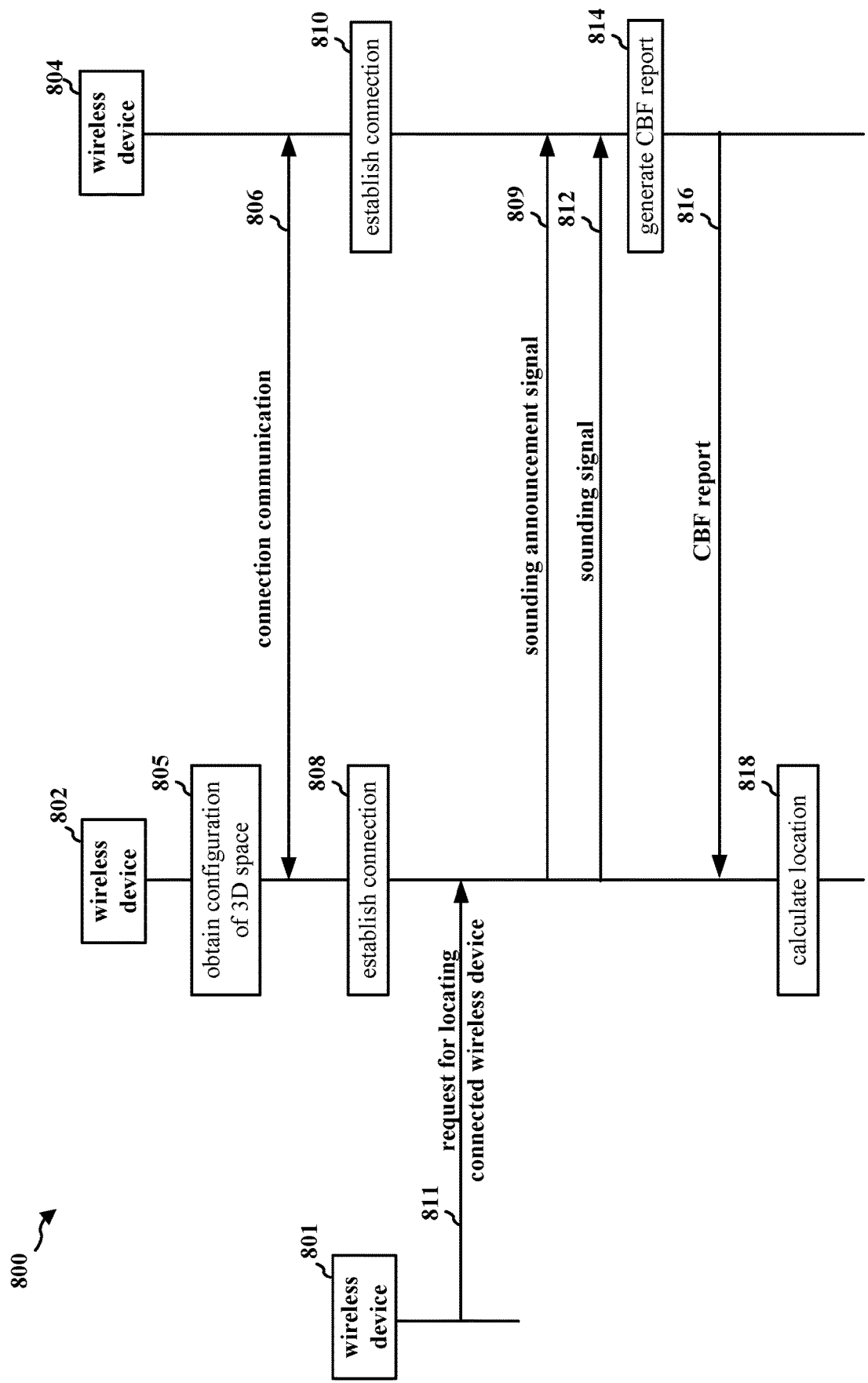
FIG. 8 is a connection flow diagram between a first wireless device configured to calculate a location of a second wireless device.

FIG. 8 is a connection flow diagram 800 between a wireless device 802 and a wireless device 804. The wireless device 802 may be an AP, a base station, a network node, a network entity, or a TRP. The wireless device 804 may be a STA or a UE. The wireless device 802 may be a UE acting as an AP, for example by being configured to tether another UE to its network (e.g., a shared Wi-Fi or Bluetooth connection), or by being configured to connect to another UE via a sidelink connection. In some aspects, the wireless device 804 may be a Wi-Fi tagged device, such as a low power tag with WLAN support. The Wi-Fi tagged device may be an 802.11ba wake-up radio or an 802.11ac/ax/be device. In another aspect, the wireless device 804 may be a Wi-Fi supported wearable or non-wearable device attached to a child, and the wireless device 802 may be a wearable or non-wearable device controlled by a parent of the child. The wireless device 802 may be used to track the wireless device 804 relative to the wireless device 802 on-demand via the sounding signal 812.

At 805, the wireless device 802 may obtain one or more configurations of a 3D space, for example by creating a configuration using the methods described with respect to FIGS. 5-7, or by copying a set of configurations from a database or another fixed wireless device.

The wireless device 802 and the wireless device 804 may exchange signals with one another via connection communication 806, for example a random access channel (RACH) message, a probe request, or an association request. The connection communication 806 may be used by the wireless device 802 and the wireless device 804 to establish a connection link between the devices. The connection communication 806 may include a request from the wireless device 804 to establish a D2D communication link with the wireless device 802, such as a Wi-Fi connection, a Bluetooth connection, or a sidelink connection link. Such a request may be part of a basic service set (BSS) of the wireless device 802. At 808, the wireless device 802 establishes a connection link with the wireless device 804. At 810 the wireless device 804 establishes a connection link with the wireless device 802.

The wireless device 802 may transmit the sounding announcement signal 809 to the wireless device 804. The wireless device 804 may receive the sounding announcement signal 809 from the wireless device 802. The sounding announcement signal 809 may schedule the sounding signal 812. The sounding announcement signal 809 may be, for example, a VHT NDP announcement. The sounding announcement signal 809 may include a preamble, training fields, and/or signaling fields for the sounding signal 812. The wireless device 802 may transmit a sounding signal 812 to the wireless device 804. The wireless device 804 may receive the sounding signal 812 from the wireless device 802. In some aspects, the sounding signal 812 may be triggered by a user or an application of another wireless device 801. The wireless device 801 may transmit a request 811 for locating a connected wireless device to the wireless device 802. The request 811 for locating a connected wireless device may include a unique identifier of the wireless device 804. For example, the wireless device 801 may be controlled by a parent of a child, and the wireless device 804 may be worn by a child, and the wireless device 801 may trigger a sounding signal to locate the child with respect to the wireless device 802. In one aspect, a user or an application of the wireless device 801 may trigger the sounding signal 812 by transmitting the request 811 to the wireless device 802 to transmit the sounding signal 812. In another aspect, a user or an application of the wireless device 802 may trigger the sounding signal 812 by activating a command to the wireless device 802 to transmit the sounding signal 812. In yet another aspect, a user or an application of the wireless device 804 may trigger the sounding signal 812 by transmitting a request to the wireless device 802 to transmit the sounding signal 812. In some aspects, the sounding signal 812 may be triggered automatically at the wireless device 802 in response to a trigger. For example, at 808, as part of the procedures to establish the connection with the wireless device 804, the wireless device 802 may transmit the sounding signal 812 to the wireless device 804. In another example, at 810, as part of the procedures to establish the connection with the wireless device 802, the wireless device 804 may transmit a request for a sounding signal to the wireless device 802.

The sounding signal 812 may include two transmissions, a first scheduling transmission and a null data packet (NDP). The scheduling transmission may be used by the wireless device 802 to announce the resources and time period used to send the NDP. The scheduling transmission may indicate in what packet bandwidth the NDP will be transmitted, MIMO control fields, and/or spatial stream parameters of the NDP. The scheduling transmission may also be called a very high throughput (VHT) NDP announcement. The NDP may include a preamble, training fields, and/or signaling fields for the sounding signal 812. The wireless device 802 may broadcast the sounding signal 812 to all devices connected to it (e.g., all STA of an AP, or all UEs of a network node), and may send the trigger frames to each wireless device, including the wireless device 804.

The wireless device 804 may receive the sounding signal 812. At 814, the wireless device 804 may generate a CBF report. The wireless device 804 may send back what it heard in the training fields of the NDP. In some aspects, the wireless device 804 may create a CBF report for each subcarrier of a set of subcarriers (e.g., set of subcarriers defined in a standard). In some aspects, the wireless device 804 may generate a CBF report for a single spatial stream. The spatial stream may be referred to as $D_{act}$.

The wireless device 804 may transmit the CBF report 816 to the wireless device 802. The wireless device 802 may receive the CBF report 816. At 818, the wireless device 802 may calculate a location of the wireless device 804 based on the CBF report 816 and the one or more configurations of 3D space obtained at 805.

In one aspect, the wireless device 802 may calculate a distance from the wireless device 804 using a calculated RTT. The RTT may be calculated based on the sounding signal 812 and the CBF report 816. The wireless device 802 may select a configuration of a 3D space based on the calculated distance, for example by selecting a configuration of a 3D space having a radius that corresponds with the calculated distance.

The wireless device 802 may perform cross-validation (CV) correlation between the CBF report 816 for $D_{act}$ verses the sets of CBF reports for the configuration of the 3D space correlated with the distance between the wireless device 802 and the wireless device 804. In other words, the wireless device 802 may perform CV correlation between the CBF report 816 and the set of CBF reports R[i][j] that were captured during calibration of the configuration of the 3D space. In some aspects, the wireless device 802 may perform CV correlation among a subset of frequency tones. For example, if the hardware of the wireless device 802 has the capability of correlating various CBF reports together corresponding to $N_{ss}$ spatial streams, then the CBF report 816 for $D_{act}$ may be correlated with a maximum of $N_{ss}-1$ worth of CBF reports from the set of CBF reports R[i][j] in one CV correlation procedure. Based on the most highly correlated CBF report R[i][j] with the CBF report 816 for $D_{act}$, the wireless device 802 may determine the location of the wireless device 804 to be P[i][j] with respect to the 3D space.

Figure 9:
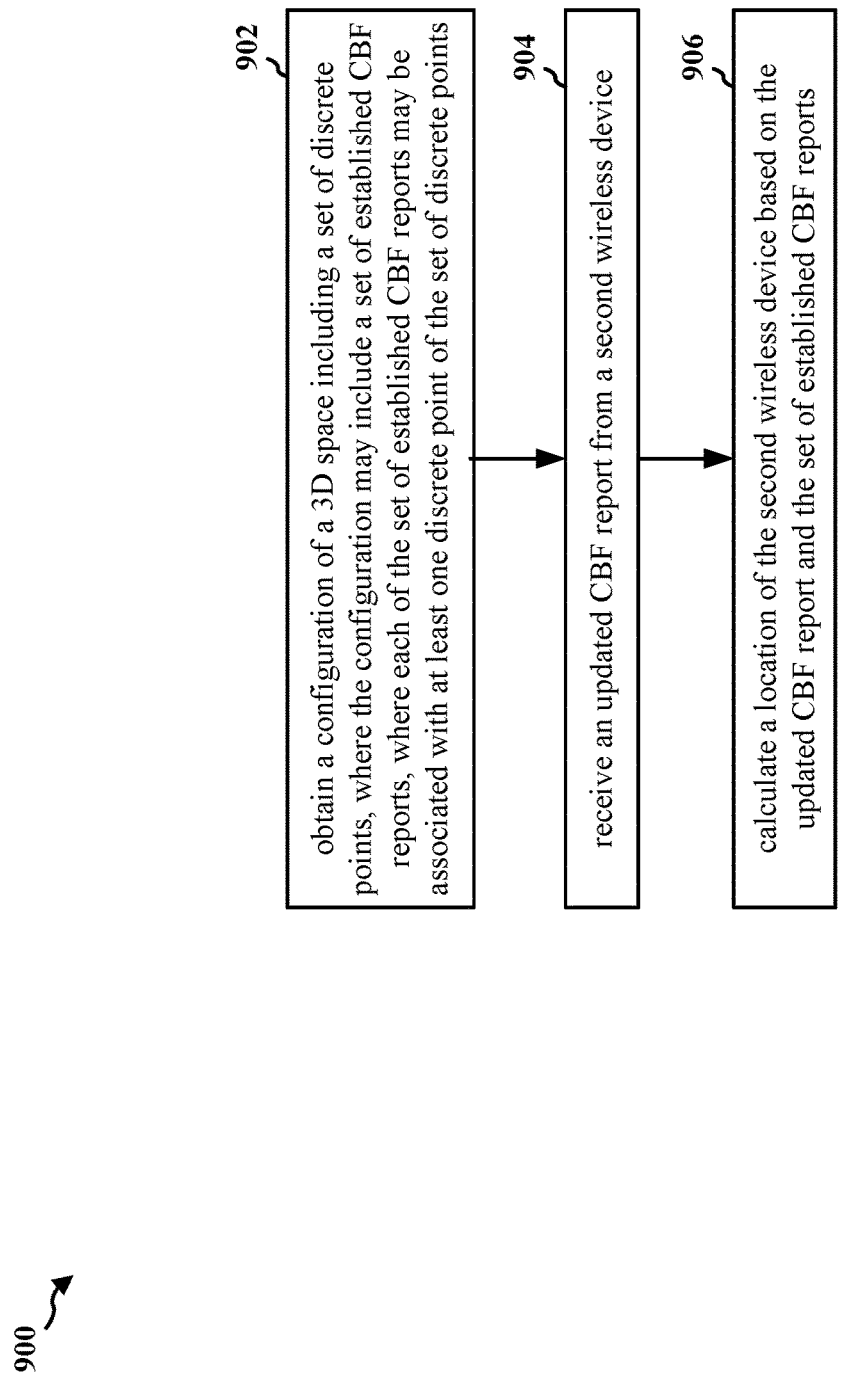
FIG. 9 is a flowchart of a method of wireless communication.

FIG. 9 is a flowchart 900 of a method of wireless communication. The method may be performed by a first wireless device (e.g., the UE 104, the UE 350, the UE 404; the AP 150; the base station 102; the AP 418, the TRP 402, the TRP 406; the wireless device 802; the apparatus 1204; the network entity 1202, the network entity 1302, the network entity 1460). At 902, the first wireless device may obtain a configuration of a 3D space including a set of discrete points. The configuration may include a set of established CBF reports. Each of the set of established CBF reports may be associated with at least one discrete point of the set of discrete points. For example, 902 may be performed by the wireless device 802 in FIG. 8, which may obtain one or more configurations of a 3D space at 805. Each 3D space may include a set of discrete points P[i][j], as shown by the point 506 and point 508 in FIG. 5. The configuration may include a set of established CBF reports R[i][j]. Each of the set of established CBF reports R[i][j] may be associated with at least one discrete point of the set of discrete points P[i][j]. Moreover, 902 may be performed by the component 198 in FIGS. 12-14.

At 904, the first wireless device may receive an updated CBF report from a second wireless device. For example, 904 may be performed by the wireless device 802 in FIG. 8, which may receive a CBF report 816 from the wireless device 804. Moreover, 904 may be performed by the component 198 in FIGS. 12-14.

At 906, the first wireless device may calculate a location of the second wireless device based on the updated CBF report and the set of established CBF reports. For example, 906 may be performed by the wireless device 802 in FIG. 8, which may, at 818, calculate a location of the wireless device 804 based on the CBF report 816 and the set of CBF reports obtained at 805. Moreover, 906 may be performed by the component 198 in FIGS. 12-14.

Figure 10:
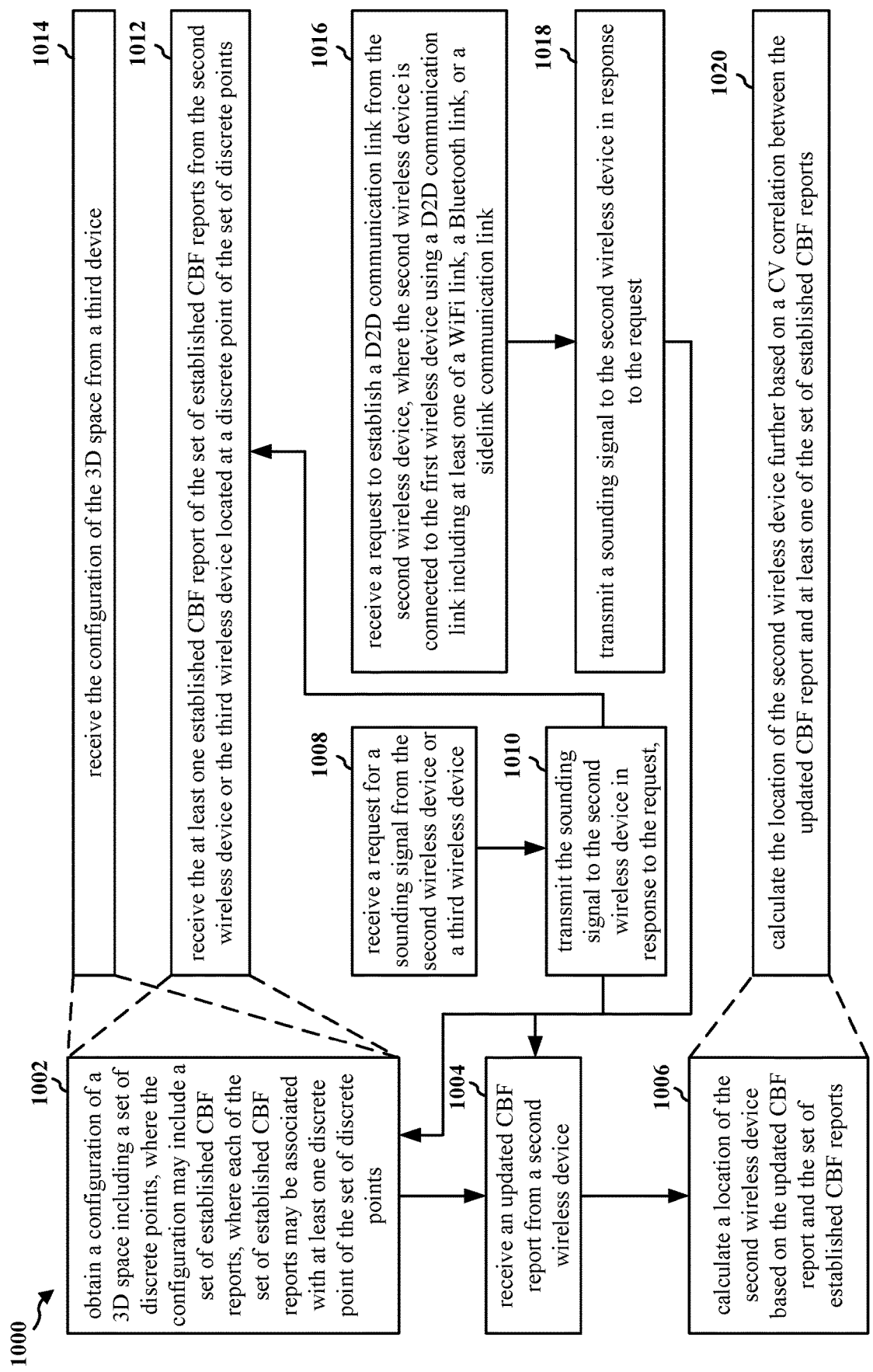
FIG. 10 is a flowchart of a method of wireless communication.

FIG. 10 is a flowchart 1000 of a method of wireless communication. The method may be performed by a first wireless device (e.g., the UE 104, the UE 350, the UE 404; the AP 150; the base station 102; the AP 418, the TRP 402, the TRP 406; the wireless device 802; the apparatus 1204; the network entity 1202, the network entity 1302, the network entity 1460). At 1002, the first wireless device may obtain a configuration of a 3D space including a set of discrete points. The configuration may include a set of established CBF reports. Each of the set of established CBF reports may be associated with at least one discrete point of the set of discrete points. For example, 1002 may be performed by the wireless device 802 in FIG. 8, which may obtain one or more configurations of a 3D space at 805. Each 3D space may include a set of discrete points P[i][j], as shown by the point 506 and point 508 in FIG. 5. The configuration may include a set of established CBF reports R[i][j]. Each of the set of established CBF reports R[i][j] may be associated with at least one discrete point of the set of discrete points P[i][j]. Moreover, 1002 may be performed by the component 198 in FIGS. 12-14.

At 1004, the first wireless device may receive an updated CBF report from a second wireless device. For example, 1004 may be performed by the wireless device 802 in FIG. 8, which may receive a CBF report 816 from the wireless device 804. Moreover, 1004 may be performed by the component 198 in FIGS. 12-14.

At 1006, the first wireless device may calculate a location of the second wireless device based on the updated CBF report and the set of established CBF reports. For example, 1006 may be performed by the wireless device 802 in FIG. 8, which may, at 818, calculate a location of the wireless device 804 based on the CBF report 816 and the set of CBF reports obtained at 805. Moreover, 1006 may be performed by the component 198 in FIGS. 12-14.

At 1008, the first wireless device may receive a request for a sounding signal from the second wireless device or a third wireless device. For example, 1008 may be performed by the wireless device 802 in FIG. 8, which may receive a request 811 for a sounding signal from the wireless device 801, from a non-fixed wireless device used to initialize the configuration of the 3D space obtained at 805, or from the wireless device 804. Moreover, 1008 may be performed by the component 198 in FIGS. 12-14.

At 1010, the first wireless device may transmit the sounding signal to the second wireless device in response to the request. For example, 1010 may be performed by the wireless device 802 in FIG. 8, which may transmit the sounding signal 812 to the wireless device 804 in response to the request 811 for the sounding signal. Moreover, 1010 may be performed by the component 198 in FIGS. 12-14.

At 1012, the first wireless device may receive the at least one established CBF report of the set of established CBF reports from the second wireless device or the third wireless device located at a discrete point of the set of discrete points. For example, 1012 may be performed by the wireless device 802 in FIG. 8, which may receive the at least one established CBF report of the set of established CBF reports from any non-fixed wireless device, such as the wireless device 804 or the non-fixed wireless device used to initialize the configuration of the 3D space obtained at 805 by being moved to discrete points of the set of discrete points, such as the discrete points P[i][j] in FIG. 5. Moreover, 1012 may be performed by the component 198 in FIGS. 12-14.

At 1014, the first wireless device may receive the configuration of the 3D space from a third device. For example, 1014 may be performed by the wireless device 802 in FIG. 8, which may receive the configuration of the 3D space at 805 from another fixed wireless device that initialized the configuration of the 3D space. Moreover, 1014 may be performed by the component 198 in FIGS. 12-14.

At 1016, the first wireless device may receive a request to establish a D2D communication link from the second wireless device. The second wireless device is connected to the first wireless device using a D2D communication link including at least one of a Wi-Fi link, a Bluetooth link, or a sidelink communication link. For example, 1016 may be performed by the wireless device 802 in FIG. 8, which may receive a request to establish a D2D communication link from the wireless device 804 as connection communication 806. Moreover, 1016 may be performed by the component 198 in FIGS. 12-14.

At 1018, the first wireless device may transmit a sounding signal to the second wireless device in response to the request. For example, 1018 may be performed by the wireless device 802 in FIG. 8, which may transmit a sounding signal 812 to the wireless device 804 in response to the connection communication 806. The connection communication 806 may trigger the establishment of the connection between the wireless device 802 and the wireless device 804 at 808, which may trigger transmission of the sounding signal 812. Moreover, 1018 may be performed by the component 198 in FIGS. 12-14.

At 1020, the first wireless device may calculate the location of the second wireless device further based on a CV correlation between the updated CBF report and at least one of the set of established CBF reports. For example, 1020 may be performed by the wireless device 802 in FIG. 8, which may calculate the location of the wireless device 804 at 818 based on a CV correlation between the CBF report 816 and at least one of the set of established CBF reports from the one or more configurations of 3D space at 805. Moreover, 1020 may be performed by the component 198 in FIGS. 12-14.

Figure 11:
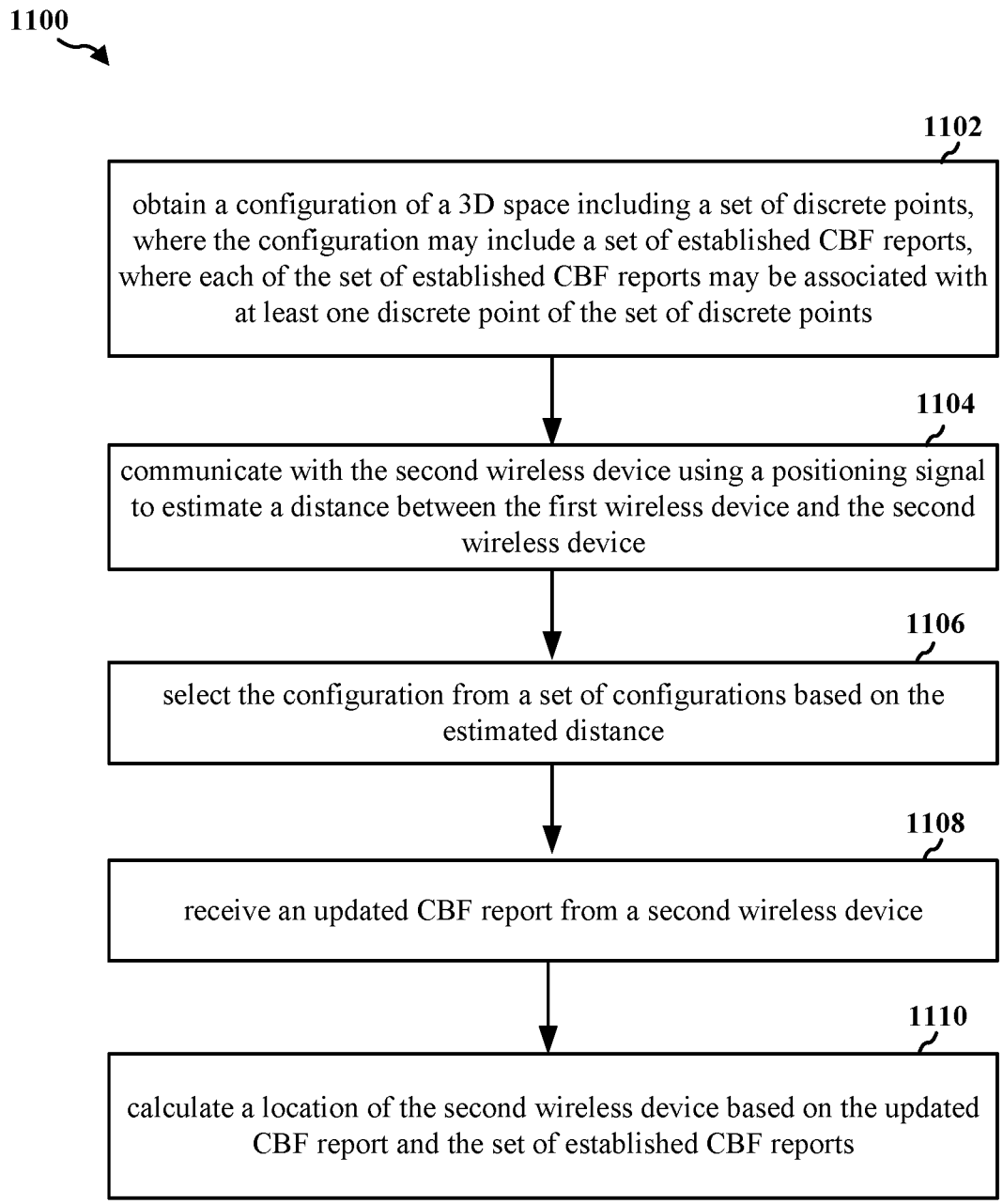
FIG. 11 is a flowchart of a method of wireless communication.

FIG. 11 is a flowchart 1100 of a method of wireless communication. The method may be performed by a first wireless device (e.g., the UE 104, the UE 350, the UE 404; the AP 150; the base station 102; the AP 418, the TRP 402, the TRP 406; the wireless device 802; the apparatus 1204; the network entity 1202, the network entity 1302, the network entity 1460). At 1102, the first wireless device may obtain a configuration of a 3D space including a set of discrete points. The configuration may include a set of established CBF reports. Each of the set of established CBF reports may be associated with at least one discrete point of the set of discrete points. For example, 1102 may be performed by the wireless device 802 in FIG. 8, which may obtain one or more configurations of a 3D space at 805. Each 3D space may include a set of discrete points P[i][j], as shown by the point 506 and point 508 in FIG. 5. The configuration may include a set of established CBF reports R[i][j]. Each of the set of established CBF reports R[i][j] may be associated with at least one discrete point of the set of discrete points P[i][j]. Moreover, 1102 may be performed by the component 198 in FIGS. 12-14.

At 1104, the first wireless device may communicate with the second wireless device using a positioning signal to estimate a distance between the first wireless device and the second wireless device. For example, 1104 may be performed by the wireless device 802 in FIG. 8, which may communicate with the wireless device 804 using a positioning signal to estimate the distance between the wireless device 802 and the wireless device 804. The sounding signal 812 may be a positioning signal. The CBF report 816 may be a positioning signal. Moreover, the UE 404 in FIG. 4 may estimate a distance between the UE 404 and the AP 418 using the D2D-PRS 420 and the D2D-SRS 422. Moreover, the TRP 406 in FIG. 4 may estimate a distance between the UE 404 and the TRP 406 using the DL-PRS 410 and the UL-SRS 412. Moreover, 1104 may be performed by the component 198 in FIGS. 12-14.

At 1106, the first wireless device may select the configuration from a set of configurations based on the estimated distance. For example, 1106 may be performed by the wireless device 802 in FIG. 8, which may select a configuration from the set of configurations obtained at 805 based on the estimated distance. Moreover, 1106 may be performed by the component 198 in FIGS. 12-14.

At 1108, the first wireless device may receive an updated CBF report from a second wireless device. For example, 1108 may be performed by the wireless device 802 in FIG. 8, which may receive a CBF report 816 from the wireless device 804. Moreover, 1108 may be performed by the component 198 in FIGS. 12-14.

At 1110, the first wireless device may calculate a location of the second wireless device based on the updated CBF report and the set of established CBF reports. For example, 1110 may be performed by the wireless device 802 in FIG. 8, which may, at 818, calculate a location of the wireless device 804 based on the CBF report 816 and the set of CBF reports obtained at 805. Moreover, 1110 may be performed by the component 198 in FIGS. 12-14.

Figure 12:
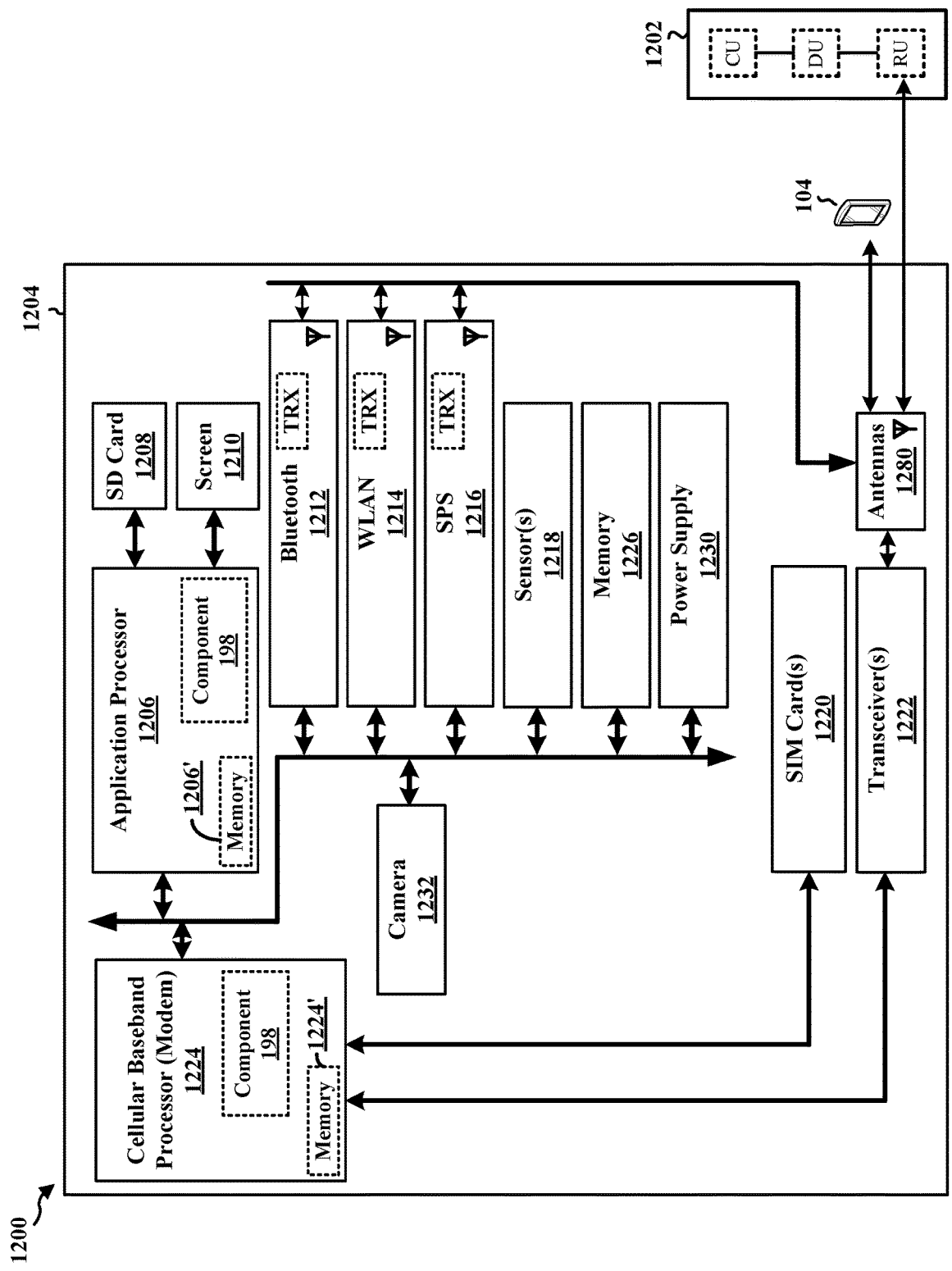
FIG. 12 is a diagram illustrating an example of a hardware implementation for an example apparatus and/or network entity.

FIG. 12 is a diagram 1200 illustrating an example of a hardware implementation for an apparatus 1204. The apparatus 1204 may be a UE, a component of a UE, or may implement UE functionality. In some aspects, the apparatus 1204 may include a cellular baseband processor 1224 (also referred to as a modem) coupled to one or more transceivers 1222 (e.g., cellular RF transceiver). The cellular baseband processor 1224 may include on-chip memory 1224'. In some aspects, the apparatus 1204 may further include one or more subscriber identity modules (SIM) cards 1220 and an application processor 1206 coupled to a secure digital (SD) card 1208 and a screen 1210. The application processor 1206 may include on-chip memory 1206'. In some aspects, the apparatus 1204 may further include a Bluetooth module 1212, a WLAN module 1214, an SPS module 1216 (e.g., GNSS module), one or more sensor modules 1218 (e.g., barometric pressure sensor/altimeter; motion sensor such as inertial measurement unit (IMU), gyroscope, and/or accelerometer(s); audio and/or other technologies used for positioning), additional memory modules 1226, a power supply 1230, and/or a camera 1232. The Bluetooth module 1212, the WLAN module 1214, and the SPS module 1216 may include an on-chip transceiver (TRX) (or in some cases, a receiver without a transmitter). The Bluetooth module 1212, the WLAN module 1214, and the SPS module 1216 may include their own dedicated antennas and/or utilize the antennas 1280 for communication. The cellular baseband processor 1224 communicates through the transceiver(s) 1222 via one or more antennas 1280 with the UE 104 and/or with an RU associated with a network entity 1202. The cellular baseband processor 1224 and the application processor 1206 may each include a computer-readable medium/memory 1224', 1206', respectively. The additional memory modules 1226 may also be considered a computer-readable medium/memory. Each computer-readable medium/memory 1224', 1206', 1226 may be non-transitory. The cellular baseband processor 1224 and the application processor 1206 are each responsible for general processing, including the execution of software stored on the computer-readable medium/memory. The software, when executed by the cellular baseband processor 1224/application processor 1206, causes the cellular baseband processor 1224/application processor 1206 to perform the various functions described supra. The computer-readable medium/memory may also be used for storing data that is manipulated by the cellular baseband processor 1224/application processor 1206 when executing software. The cellular baseband processor 1224/application processor 1206 may be a component of the UE 350 and may include the memory 360 and/or at least one of the Tx processor 368, the Rx processor 356, and the controller/processor 359. In one configuration, the apparatus 1204 may be a processor chip (modem and/or application) and include just the cellular baseband processor 1224 and/or the application processor 1206, and in another configuration, the apparatus 1204 may be the entire UE (e.g., see UE 350 of FIG. 3) and include the additional modules of the apparatus 1204.

As discussed supra, the component 198 is configured to obtain a configuration of a 3D space. The 3D space may include a set of discrete points. The configuration may include a set of established CBF reports. Each of the set of established CBF reports may be associated with at least one discrete point of the set of discrete points. The component 198 may receive an updated CBF report from a wireless device. The component 198 may calculate a location of the wireless device based on the updated CBF report and the set of established CBF reports. The component 198 may be within the cellular baseband processor 1224, the application processor 1206, or both the cellular baseband processor 1224 and the application processor 1206. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1204 may include a variety of components configured for various functions. In one configuration, the apparatus 1204, and in particular the cellular baseband processor 1224 and/or the application processor 1206, includes means for obtaining a configuration of a 3D space including a set of discrete points. The apparatus 1204 may include means for receiving an updated CBF report from a second wireless device. The apparatus 1204 may include means for calculating a location of the second wireless device based on the updated CBF report and the set of established CBF reports. The apparatus 1204 may include means for receiving a request to establish the D2D communication link from the second wireless device. The apparatus 1204 may include means for transmitting a sounding signal to the second wireless device in response to the request. The apparatus 1204 may include means for receiving the updated CBF report in response to transmitting the sounding signal. The apparatus 1204 may include means for receiving a request for a sounding signal from the second wireless device or a third wireless device. The apparatus 1204 may include means for transmitting the sounding signal to the second wireless device in response to the request. The apparatus 1204 may include means for receiving at least one of the updated CBF report or at least one established CBF report of the set of established CBF reports in response to transmitting the sounding signal. The apparatus 1204 may include means for obtaining the configuration of the 3D space by receiving the at least one established CBF report of the set of established CBF reports from the second wireless device or the third wireless device located at a discrete point of the set of discrete points. The apparatus 1204 may include means for obtaining the configuration of the 3D space by receiving the configuration of the 3D space from a third device. The apparatus 1204 may include means for calculating the location of the second wireless device further based on a CV correlation between the updated CBF report and at least one of the set of established CBF reports. The apparatus 1204 may include means for communicating with the second wireless device using a positioning signal to estimate a distance between the first wireless device and the second wireless device. The apparatus 1204 may include means for selecting the configuration from a set of configurations based on the estimated distance. The means may be the component 198 of the apparatus 1204 configured to perform the functions recited by the means. As described supra, the apparatus 1204 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 13:
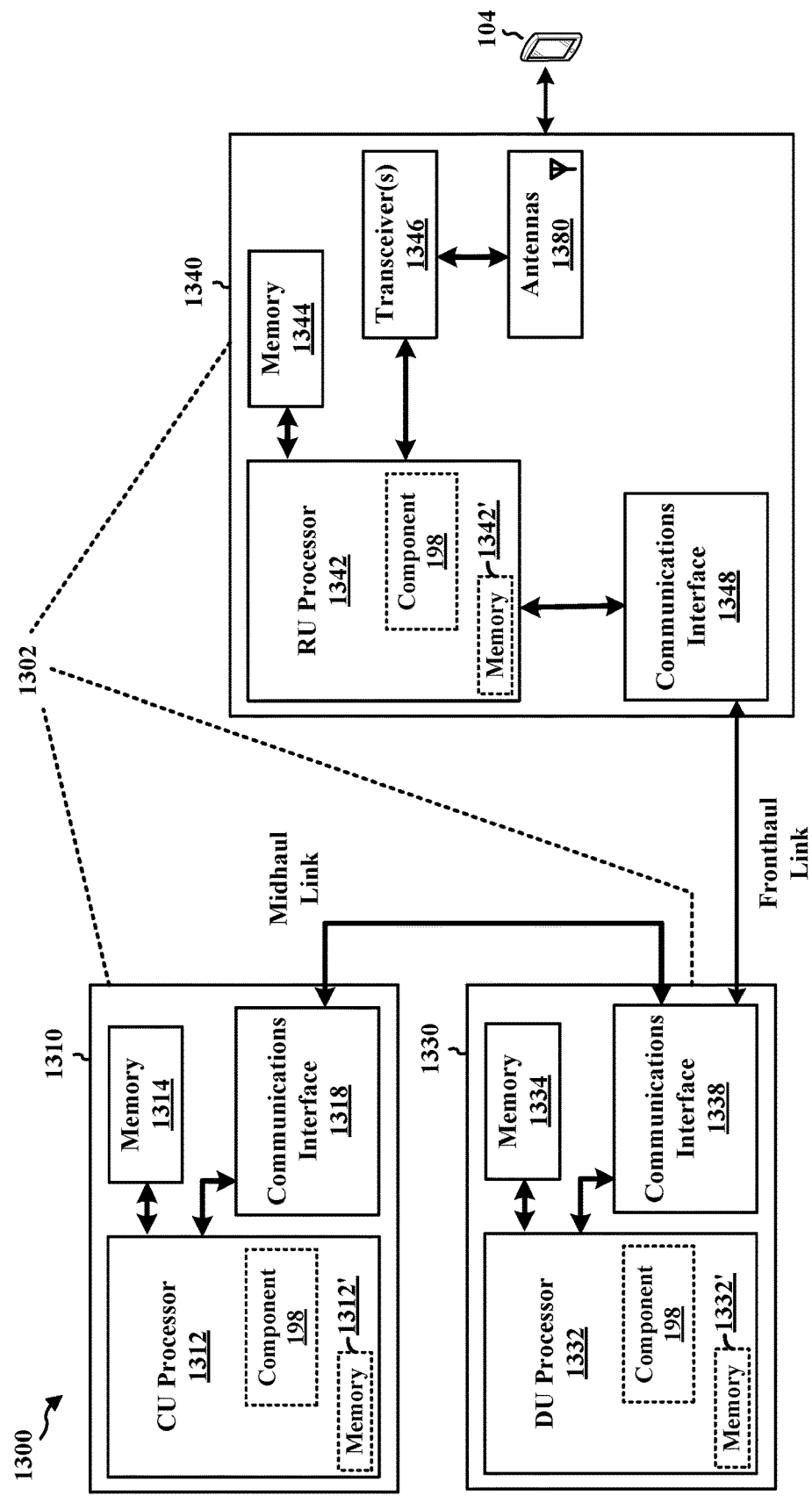
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the component 198, the network entity 1302 may include the CU 1310; both the CU 1310 and the DU 1330; each of the CU 1310, the DU 1330, and the RU 1340; the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 is configured to obtain a configuration of a 3D space. The 3D space may include a set of discrete points. The configuration may include a set of established CBF reports. Each of the set of established CBF reports may be associated with at least one discrete point of the set of discrete points. The component 198 may receive an updated CBF report from a wireless device. The component 198 may calculate a location of the wireless device based on the updated CBF report and the set of established CBF reports. The component 198 may be within one or more processors of one or more of the CU 1310, DU 1330, and the RU 1340. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for obtaining a configuration of a 3D space including a set of discrete points. The network entity 1302 may include means for receiving an updated CBF report from a second wireless device. The network entity 1302 may include means for calculating a location of the second wireless device based on the updated CBF report and the set of established CBF reports. The network entity 1302 may include means for receiving a request to establish the D2D communication link from the second wireless device. The network entity 1302 may include means for transmitting a sounding signal to the second wireless device in response to the request. The network entity 1302 may include means for receiving the updated CBF report in response to transmitting the sounding signal. The network entity 1302 may include means for receiving a request for a sounding signal from the second wireless device or a third wireless device. The network entity 1302 may include means for transmitting the sounding signal to the second wireless device in response to the request. The network entity 1302 may include means for receiving at least one of the updated CBF report or at least one established CBF report of the set of established CBF reports in response to transmitting the sounding signal. The network entity 1302 may include means for obtaining the configuration of the 3D space by receiving the at least one established CBF report of the set of established CBF reports from the second wireless device or the third wireless device located at a discrete point of the set of discrete points. The network entity 1302 may include means for obtaining the configuration of the 3D space by receiving the configuration of the 3D space from a third device. The network entity 1302 may include means for calculating the location of the second wireless device further based on a CV correlation between the updated CBF report and at least one of the set of established CBF reports. The network entity 1302 may include means for communicating with the second wireless device using a positioning signal to estimate a distance between the first wireless device and the second wireless device. The network entity 1302 may include means for selecting the configuration from a set of configurations based on the estimated distance. The means may be the component 198 of the network entity 1302 configured to perform the functions recited by the means. As described supra, the network entity 1302 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 14:
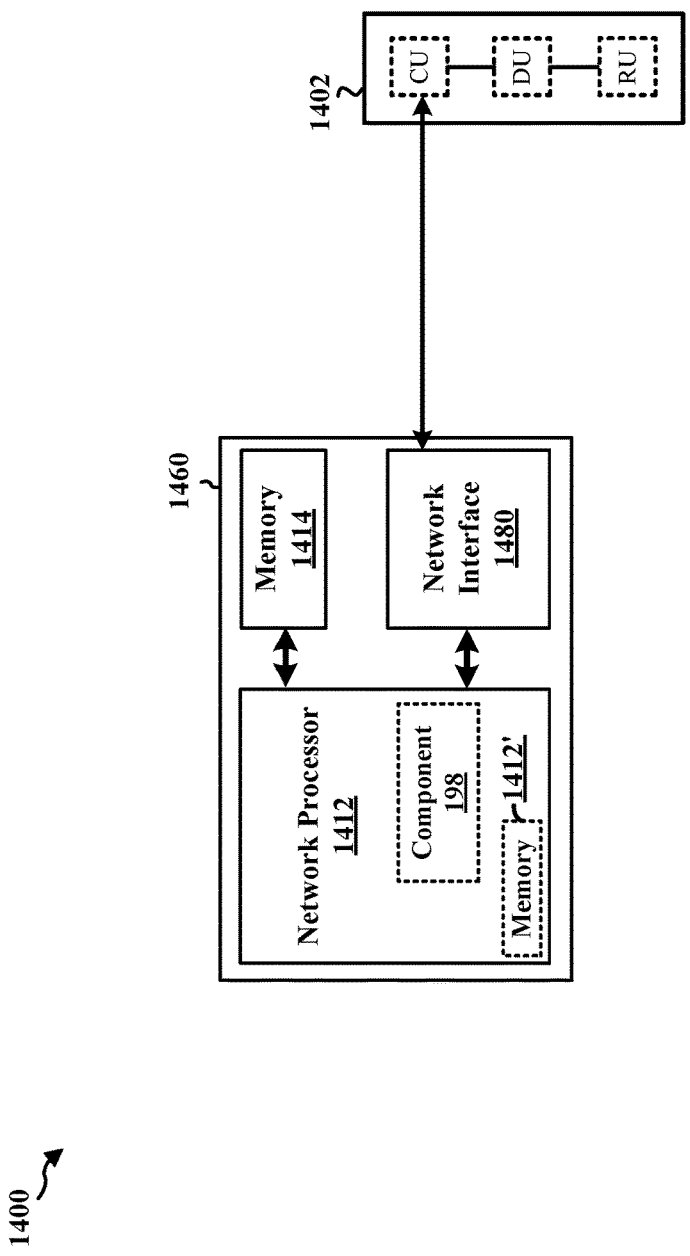
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 198 is configured to obtain a configuration of a 3D space. The 3D space may include a set of discrete points. The configuration may include a set of established CBF reports. Each of the set of established CBF reports may be associated with at least one discrete point of the set of discrete points. The component 198 may receive an updated CBF report from a wireless device. The component 198 may calculate a location of the wireless device based on the updated CBF report and the set of established CBF reports. The component 198 may be within the processor 1412. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for obtaining a configuration of a 3D space including a set of discrete points. The network entity 1460 may include means for receiving an updated CBF report from a second wireless device. The network entity 1460 may include means for calculating a location of the second wireless device based on the updated CBF report and the set of established CBF reports. The network entity 1460 may include means for receiving a request to establish the D2D communication link from the second wireless device. The network entity 1460 may include means for transmitting a sounding signal to the second wireless device in response to the request. The network entity 1460 may include means for receiving the updated CBF report in response to transmitting the sounding signal. The network entity 1460 may include means for receiving a request for a sounding signal from the second wireless device or a third wireless device. The network entity 1460 may include means for transmitting the sounding signal to the second wireless device in response to the request. The network entity 1460 may include means for receiving at least one of the updated CBF report or at least one established CBF report of the set of established CBF reports in response to transmitting the sounding signal. The network entity 1460 may include means for obtaining the configuration of the 3D space by receiving the at least one established CBF report of the set of established CBF reports from the second wireless device or the third wireless device located at a discrete point of the set of discrete points. The network entity 1460 may include means for obtaining the configuration of the 3D space by receiving the configuration of the 3D space from a third device. The network entity 1460 may include means for calculating the location of the second wireless device further based on a CV correlation between the updated CBF report and at least one of the set of established CBF reports. The network entity 1460 may include means for communicating with the second wireless device using a positioning signal to estimate a distance between the first wireless device and the second wireless device. The network entity 1460 may include means for selecting the configuration from a set of configurations based on the estimated distance. The means may be the component 198 of the network entity 1460 configured to perform the functions recited by the means.

Use of a set of configurations of a 3D space including a set of discrete points may utilize a great deal of calibration, but the calibration process may be a one-time procedure for an unobstructed channel (free space) or a predefined space. After calibration, the CBF reports may be stored and used on-demand by the fixed wireless device that performed the calibrating, or any other fixed wireless device-particularly those of the same type. Utilization of the CBF report characteristics at various positions in a 3D space with respect to the fixed wireless device eliminates a need for multiple fixed wireless devices to determine a location of a non-fixed wireless device. The CBF report may be generated with a fixed wireless device through explicit sounding procedures (e.g., defined in IEEE 802.11 a/n) or collected from a non-fixed wireless device through explicit sounding procedures (e.g., defined in IEEE 802.11 n/ac/ax/be standards). The minimum complex parameters contributing to the CBF size may be enough to achieve direction determination. For example, a packet bandwidth of 20 MHz with 1 column and 2 rows in the CBF matrix with a subcarrier grouping of 16, 20 subcarriers, no codebook of the CBF information, no feedback type of the CBF information, and 6 bits used to represent each subcarrier may use a CBF report size of 120 bits per CBF report.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a first wireless device, where the method may include obtaining a configuration of a three-dimensional (3D) space including a set of discrete points. The configuration may include a set of established CBF reports. Each of the set of established CBF reports may be associated with at least one discrete point of the set of discrete points. The method may include receiving an updated CBF report from a second wireless device. The method may include calculating a location of the second wireless device based on the updated CBF report and the set of established CBF reports.

Aspect 2 is the method of aspect 1, where the first wireless device may include at least one of an AP, a base station, a network node, a network entity, or a TRP.

Aspect 3 is the method of any of aspects 1 and 2, where the second wireless device may include at least one of a STA or a UE.

Aspect 4 is the method of any of aspects 1 to 3, where the second wireless device may be connected to the first wireless device using a D2D communication link, such as at least one of a Wi-Fi link, a Bluetooth link, or a sidelink communication link.

Aspect 5 is the method of aspect 4, where the method may include receiving a request to establish the D2D communication link from the second wireless device. The method may include transmitting a sounding signal to the second wireless device in response to the request. Receiving the updated CBF report may be in response to transmitting the sounding signal.

Aspect 6 is the method of any of aspects 1 to 5, where the method may include receiving a request for a sounding signal from the second wireless device or a third wireless device. The method may include transmitting the sounding signal to the second wireless device in response to the request. Receiving at least one of the updated CBF report or at least one established CBF report of the set of established CBF reports may be in response to transmitting the sounding signal.

Aspect 7 is the method of aspect 6, where obtaining the configuration of the 3D space may include receiving the at least one established CBF report of the set of established CBF reports from the second wireless device or the third wireless device located at a discrete point of the set of discrete points.

Aspect 8 is the method of any of aspects 1 to 7, where obtaining the configuration of the 3D space may include receiving the configuration of the 3D space from a third device.

Aspect 9 is the method of aspect 8, where the first wireless device may include a database storing a set of configurations. The set of configurations may include the configuration of the 3D space.

Aspect 10 is the method of aspects 8 or 9, where the first wireless device may include a first device type. The third device may also include the first device type.

Aspect 11 is the method of any of aspects 1 to 10, where calculating the location of the second wireless device may be further based on a CV correlation between the updated CBF report and at least one of the set of established CBF reports.

Aspect 12 is the method of aspect 11, where the CV correlation may include a correlation among a subset of frequency tones of a set of frequency tones associated with the updated CBF report.

Aspect 13 is the method of any of aspects 1 to 12, where the 3D space may include a sphere. Each of the set of discrete points may be associated with a latitude value and a longitude value associated with the sphere.

Aspect 14 is the method of any of aspects 1 to 13, where the method may include communicating with the second wireless device using a positioning signal to estimate a distance between the first wireless device and the second wireless device. The method may include selecting the configuration from a set of configurations based on the estimated distance.

Aspect 15 is the method of aspect 14, where the 3D space may include a sphere having a radius correlated with the estimated distance.

Aspect 16 is an apparatus for wireless communication, including: a memory; and at least one processor coupled to the memory and, based at least in part on information stored in the memory, the at least one processor is configured to implement any of aspects 1 to 15.

Aspect 17 is the apparatus of aspect 16, further including at least one of an antenna or a transceiver coupled to the at least one processor.

Aspect 18 is an apparatus for wireless communication including means for implementing any of aspects 1 to 15.

Aspect 19 is a computer-readable medium (e.g., a non-transitory computer-readable medium) storing computer executable code, where the code when executed by a processor causes the processor to implement any of aspects 1 to 15.

What is claimed is:

1. An apparatus for wireless communication at a first wireless device, comprising:
   a memory; and
   at least one processor coupled to the memory and, based at least in part on information stored in the memory, the at least one processor is configured to:
   obtain a configuration of a three-dimensional (3D) space comprising a set of discrete points, wherein the configuration comprises a set of established compressed beamforming (CBF) reports, wherein each of the set of established CBF reports is associated with at least one discrete point of the set of discrete points;
   receive an updated CBF report from a second wireless device; and
   calculate a location of the second wireless device based on the updated CBF report and the set of established CBF reports, wherein the at least one processor is further configured to:
   receive a request for a sounding signal from the second wireless device or a third wireless device; and
   transmit the sounding signal to the second wireless device in response to the request, wherein to receive at least one of the updated CBF report or at least one established CBF report of the set of established CBF reports, the at least one processor is configured to receive the at least one of the updated CBF report or the at least one established CBF report of the set of established CBF reports in response to transmitting the sounding signal.

2. The apparatus of claim 1, wherein the first wireless device comprises at least one of an access point (AP), a base station, a network node, a network entity, or a transmission reception point (TRP).

3. The apparatus of claim 1, wherein the second wireless device comprises at least one of a station (STA) or a user equipment (UE).

4. The apparatus of claim 1, wherein the second wireless device is connected to the first wireless device using a device-to-device (D2D) communication link comprising at least one of a Wi-Fi link, a Bluetooth link, or a sidelink communication link.

5. The apparatus of claim 4, wherein the at least one processor is further configured to:
   receive a request to establish the D2D communication link from the second wireless device; and
   transmit a sounding signal to the second wireless device in response to the request, wherein to receive the updated CBF report, the at least one processor is configured to receive the updated CBF report in response to transmitting the sounding signal.

6. The apparatus of claim 1, wherein to obtain the configuration of the 3D space, the at least one processor is configured to:
   receive the at least one established CBF report of the set of established CBF reports from the second wireless device or the third wireless device located at a discrete point of the set of discrete points.

7. The apparatus of claim 1, wherein to obtain the configuration of the 3D space, the at least one processor is configured to:
   receive the configuration of the 3D space from a third device.

8. The apparatus of claim 7, wherein the first wireless device comprises a database storing a set of configurations, wherein the set of configurations comprises the configuration of the 3D space.

9. The apparatus of claim 7, wherein the first wireless device comprises a first device type, and wherein the third device also comprises the first device type.

10. The apparatus of claim 1, wherein to calculate the location of the second wireless device, the at least one processor is configured to:
    calculate the location of the second wireless device further based on a cross-validation (CV) correlation between the updated CBF report and at least one of the set of established CBF reports.

11. The apparatus of claim 10, wherein the CV correlation comprises a correlation among a subset of frequency tones of a set of frequency tones associated with the updated CBF report.

12. The apparatus of claim 1, wherein the 3D space comprises a sphere, and wherein each of the set of discrete points is associated with a latitude value and a longitude value associated with the sphere.

13. The apparatus of claim 1, wherein the at least one processor is further configured to:
communicate with the second wireless device using a positioning signal to estimate a distance between the first wireless device and the second wireless device; and
select the configuration from a set of configurations based on the estimated distance.

14. The apparatus of claim 13, wherein the 3D space comprises a sphere having a radius correlated with the estimated distance.

15. The apparatus of claim 1, further comprising a transceiver coupled to the at least one processor, wherein to receive the updated CBF report from the second wireless device, the at least one processor is configured to receive the updated CBF report from the second wireless device via the transceiver.

16. A method of wireless communication at a first wireless device, comprising:
obtaining a configuration of a three-dimensional (3D) space comprising a set of discrete points, wherein the configuration comprises a set of established compressed beamforming (CBF) reports, wherein each of the set of established CBF reports is associated with at least one discrete point of the set of discrete points;
receiving an updated CBF report from a second wireless device; and
calculating a location of the second wireless device based on the updated CBF report and the set of established CBF reports, wherein the method further comprising:
receiving a request for a sounding signal from the second wireless device or a third wireless device; and
transmitting the sounding signal to the second wireless device in response to the request, wherein receiving at least one of the updated CBF report or at least one established CBF report of the set of established CBF reports is in response to transmitting the sounding signal.

17. The method of claim 16, wherein the first wireless device comprises at least one of an access point (AP), a base station, a network node, a network entity, or a transmission reception point (TRP).

18. The method of claim 16, wherein the second wireless device comprises at least one of a station (STA) or a user equipment (UE).

19. The method of claim 16, wherein the second wireless device is connected to the first wireless device using a device-to-device (D2D) communication link comprising at least one of a Wi-Fi link, a Bluetooth link, or a sidelink communication link.

20. The method of claim 19, further comprising:
receiving a request to establish the D2D communication link from the second wireless device; and
transmitting a sounding signal to the second wireless device in response to the request, wherein receiving the updated CBF report is in response to transmitting the sounding signal.

21. The method of claim 16, further comprising:
receiving the at least one established CBF report of the set of established CBF reports from the second wireless device or the third wireless device located at a discrete point of the set of discrete points.

22. The method of claim 16, wherein obtaining the configuration of the 3D space comprises:
receiving the configuration of the 3D space from a third device.

23. The method of claim 22, wherein the first wireless device comprises a database storing a set of configurations, wherein the set of configurations comprises the configuration of the 3D space.

24. The method of claim 22, wherein the first wireless device comprises a first device type, and wherein the third device also comprises the first device type.

25. The method of claim 16, wherein calculating the location of the second wireless device is further based on a cross-validation (CV) correlation between the updated CBF report and at least one of the set of established CBF reports, wherein the CV correlation comprises a correlation among a subset of frequency tones of a set of frequency tones associated with the updated CBF report.

26. The method of claim 16, wherein the 3D space comprises a sphere, and wherein each of the set of discrete points is associated with a latitude value and a longitude value associated with the sphere.

27. The method of claim 16, further comprising:
communicating with the second wireless device using a positioning signal to estimate a distance between the first wireless device and the second wireless device; and
selecting the configuration from a set of configurations based on the estimated distance, wherein the 3D space comprises a sphere having a radius correlated with the estimated distance.

28. An apparatus for wireless communication at a first wireless device, comprising:
means for obtaining a configuration of a three-dimensional (3D) space comprising a set of discrete points, wherein the configuration comprises a set of established compressed beamforming (CBF) reports, wherein each of the set of established CBF reports is associated with at least one discrete point of the set of discrete points;
means for receiving an updated CBF report from a second wireless device; and
means for calculating a location of the second wireless device based on the updated CBF report and the set of established CBF reports, wherein the apparatus further comprising:
means for receiving a request for a sounding signal from the second wireless device or a third wireless device; and
means for transmitting the sounding signal to the second wireless device in response to the request, wherein receiving at least one of the updated CBF report or at least one established CBF report of the set of established CBF reports is in response to transmitting the sounding signal.

29. A computer-readable medium storing computer executable code at first wireless device, the code when executed by a processor causes the processor to:
obtain a configuration of a three-dimensional (3D) space comprising a set of discrete points, wherein the configuration comprises a set of established compressed beamforming (CBF) reports, wherein each of the set of established CBF reports is associated with at least one discrete point of the set of discrete points;
receive an updated CBF report from a second wireless device; and
calculate a location of the second wireless device based on the updated CBF report and the set of established CBF reports, wherein the code causes the processor further to:

receive a request for a sounding signal from the second wireless device or a third wireless device; and transmit the sounding signal to the second wireless device in response to the request, wherein to receive at least one of the updated CBF report or at least one established CBF report of the set of established CBF reports is in response to transmitting the sounding signal.

* * * * *